US012603502B2

(12) United States Patent　　(10) Patent No.:　US 12,603,502 B2
Itaya　　(45) Date of Patent:　Apr. 14, 2026

(54) COMMAND DEVICE, CHARGE-DISCHARGE CONTROL SYSTEM, POWER CONTROL SYSTEM, CENTRAL COMMAND DEVICE, SETTING VALUE MANAGEMENT DEVICE, CHARGE-DISCHARGE CONTROL METHOD, AND STORAGE MEDIUM

(71) Applicant: Mitsubishi Electric Corporation, Tokyo (JP)

(72) Inventor: Nobuhiko Itaya, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 365 days.

(21) Appl. No.: 18/262,929

(22) PCT Filed: Feb. 26, 2021

(86) PCT No.: PCT/JP2021/007405
§ 371 (c)(1),
(2) Date: Jul. 26, 2023

(87) PCT Pub. No.: WO2022/180799
PCT Pub. Date: Sep. 1, 2022

(65) Prior Publication Data
US 2024/0088661 A1　　Mar. 14, 2024

(51) Int. Cl.
*H02J 3/32*　　(2006.01)
*H02J 3/00*　　(2006.01)
(Continued)

(52) U.S. Cl.
CPC ............... *H02J 3/32* (2013.01); *H02J 3/003* (2020.01); *H02J 3/24* (2013.01); *H02J 3/46* (2013.01);
(Continued)

(58) Field of Classification Search
CPC ..... H02J 3/00; H02J 3/38; H02J 13/00; Y02E 60/00; Y02T 90/167; Y04S 10/126; Y04S 30/12; Y04S 30/14
See application file for complete search history.

(56) References Cited

U.S. PATENT DOCUMENTS

| 2016/0006248 | A1* | 1/2016 | Sakuma | .................... | H02J 3/46 |
| | | | | | 290/55 |
| 2017/0104332 | A1* | 4/2017 | Wenzel | ................ | G01R 31/392 |
| 2021/0376615 | A1* | 12/2021 | Honzawa | ............ | H02J 7/00306 |

FOREIGN PATENT DOCUMENTS

| JP | 2016213919 A | * | 12/2016 |
| JP | 2018007391 A | * | 1/2018 |

(Continued)

OTHER PUBLICATIONS

International Search Report (PCT/ISA/210) with English translation and Written Opinion (PCT/ISA/237) mailed on May 11, 2021, by the Japanese Patent Office as the International Searching Authority for International Application No. PCT/JP2021/007405.

(Continued)

*Primary Examiner* — Mohammad Ali
*Assistant Examiner* — Dhruvkumar Patel
(74) *Attorney, Agent, or Firm* — BUCHANAN, INGERSOLL & ROONEY PC

(57)　　ABSTRACT

A command device according to the present disclosure includes a first communication unit that receives a first command value representing an externally-commanded charge-discharge amount with respect to a storage battery connected to a power system, a low-pass filter and a high-pass filter for extracting a short-period component of a measurement value with respect to electrical power at an interconnection point of a PCS that controls charging and discharging of the storage battery, and an amount-of-control calculation unit that calculates a third command value by (Continued)

addition of a first command value and a second command value generated based on the short-period component, and commands the PCS to use the third command value.

21 Claims, 12 Drawing Sheets

(51) Int. Cl.
*H02J 3/24* (2006.01)
*H02J 3/46* (2006.01)
*H02J 7/35* (2006.01)
*H02J 13/00* (2006.01)

(52) U.S. Cl.
CPC .......... *H02J 7/35* (2013.01); *H02J 13/00006* (2020.01); *H02J 2300/24* (2020.01)

(56) References Cited

FOREIGN PATENT DOCUMENTS

| | | | |
|----|------------|----|---------|
| JP | 2018160993 | A  | 10/2018 |
| JP | 2020089087 | A  | 6/2020  |
| WO | 2014129045 | A1 | 8/2014  |

OTHER PUBLICATIONS

Taiwanese Office Action with English translation, issued in corresponding Patent Application No. 111105919 dated Dec. 6, 2022, 14 pages.

* cited by examiner

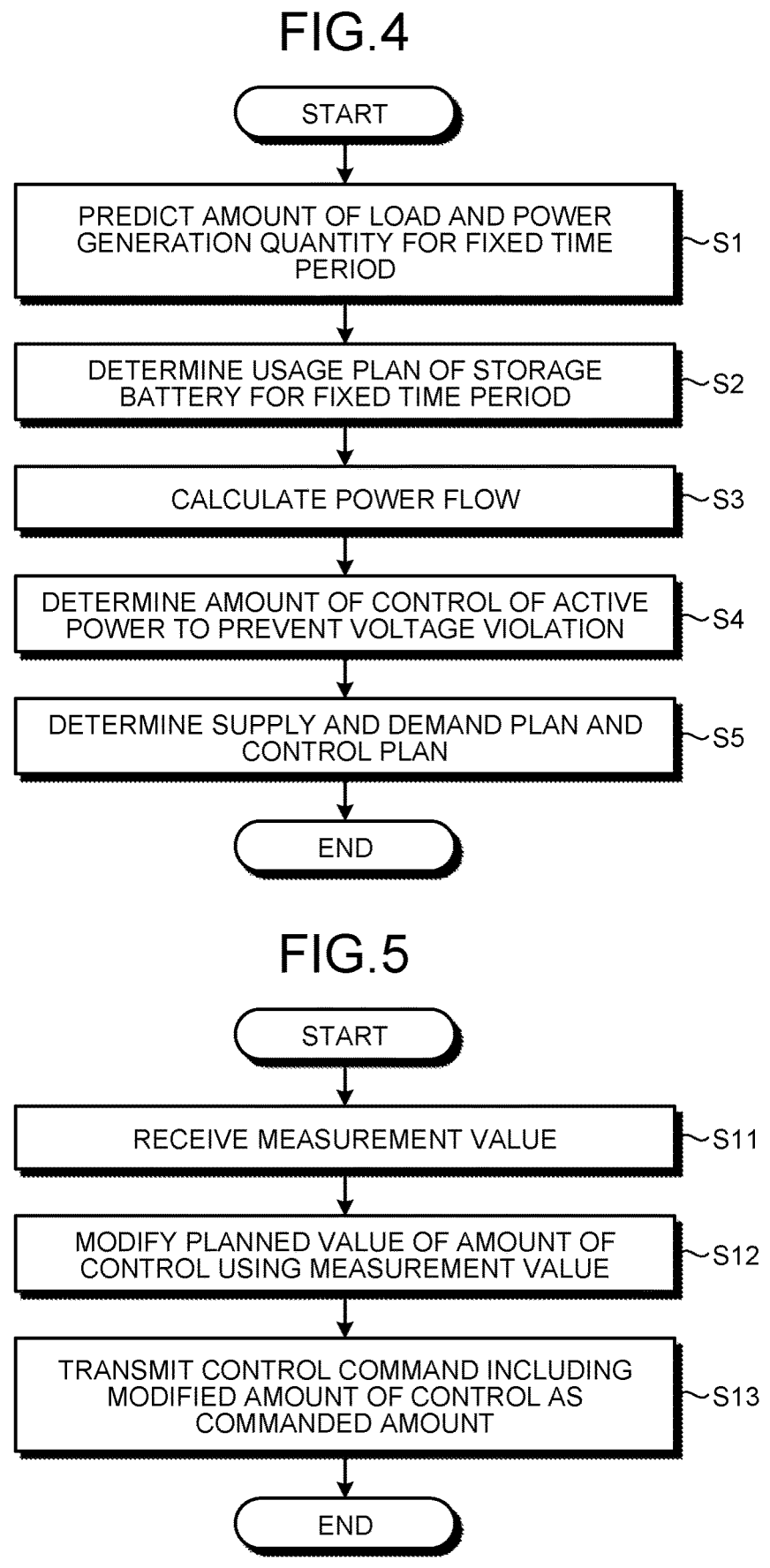

START

↓

PREDICT AMOUNT OF LOAD AND POWER GENERATION QUANTITY FOR FIXED TIME PERIOD ~S1

↓

DETERMINE USAGE PLAN OF STORAGE BATTERY FOR FIXED TIME PERIOD ~S2

↓

CALCULATE POWER FLOW ~S3

↓

DETERMINE AMOUNT OF CONTROL OF ACTIVE POWER TO PREVENT VOLTAGE VIOLATION ~S4

↓

DETERMINE SUPPLY AND DEMAND PLAN AND CONTROL PLAN ~S5

↓

END

FIG.5

START

↓

RECEIVE MEASUREMENT VALUE ~S11

↓

MODIFY PLANNED VALUE OF AMOUNT OF CONTROL USING MEASUREMENT VALUE ~S12

↓

TRANSMIT CONTROL COMMAND INCLUDING MODIFIED AMOUNT OF CONTROL AS COMMANDED AMOUNT ~S13

↓

END

FIG.7

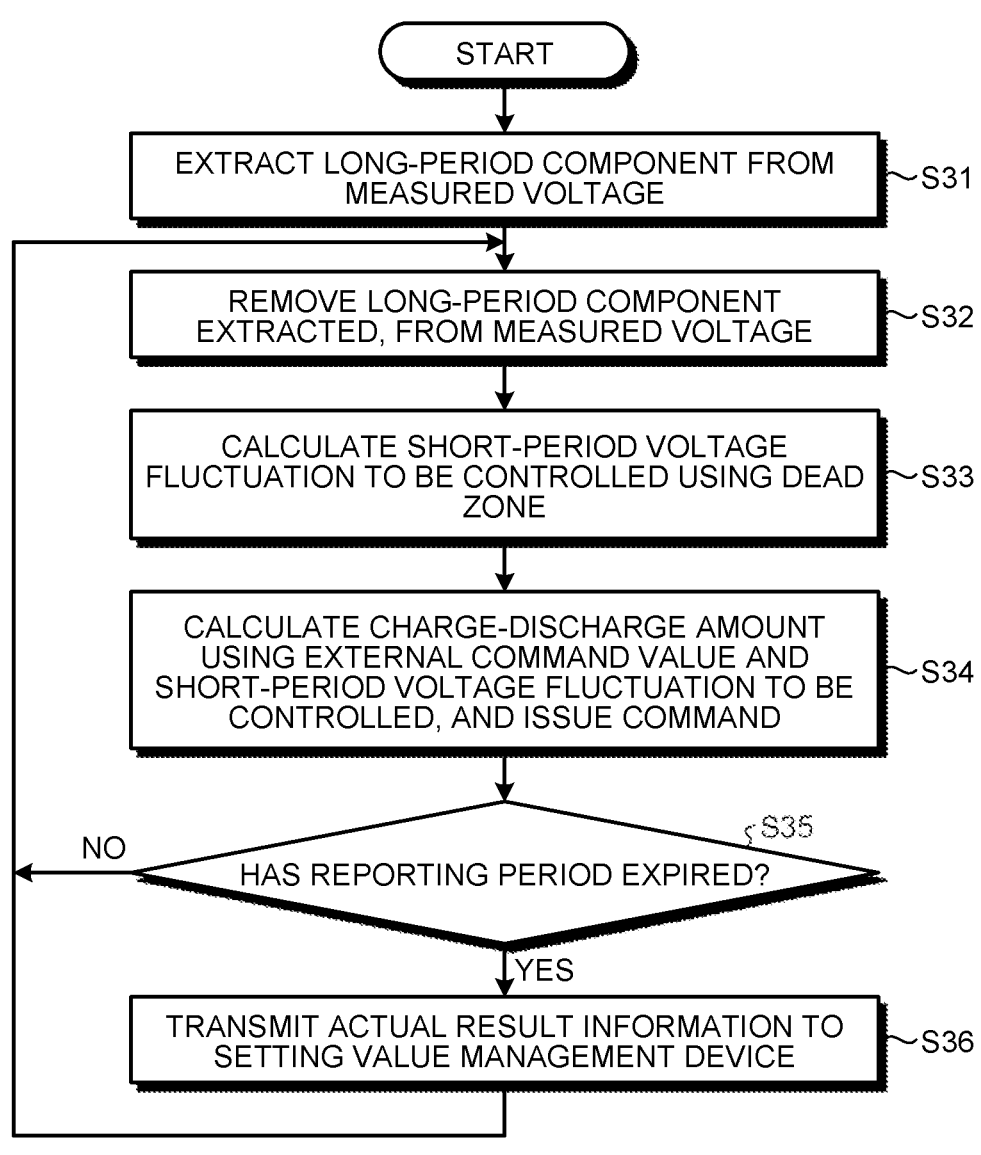

START

EXTRACT LONG-PERIOD COMPONENT FROM MEASURED VOLTAGE ~S31

REMOVE LONG-PERIOD COMPONENT EXTRACTED, FROM MEASURED VOLTAGE ~S32

CALCULATE SHORT-PERIOD VOLTAGE FLUCTUATION TO BE CONTROLLED USING DEAD ZONE ~S33

CALCULATE CHARGE-DISCHARGE AMOUNT USING EXTERNAL COMMAND VALUE AND SHORT-PERIOD VOLTAGE FLUCTUATION TO BE CONTROLLED, AND ISSUE COMMAND ~S34

HAS REPORTING PERIOD EXPIRED? S35

NO

YES

TRANSMIT ACTUAL RESULT INFORMATION TO SETTING VALUE MANAGEMENT DEVICE ~S36

COMMAND DEVICE, CHARGE-DISCHARGE CONTROL SYSTEM, POWER CONTROL SYSTEM, CENTRAL COMMAND DEVICE, SETTING VALUE MANAGEMENT DEVICE, CHARGE-DISCHARGE CONTROL METHOD, AND STORAGE MEDIUM

FIELD

The present disclosure relates to a command device that generates a command for controlling electrical power (hereinafter referred to simply as power) of a storage battery, a sunlight power generation facility, and/or the like, and to a charge-discharge control system, a power control system, a central command device, a setting value management device, a charge-discharge control method, and a storage medium.

BACKGROUND

Distributed power supplies such as sunlight power generation facilities, storage batteries, and electric vehicles (BVs) (also each referred to electrically powered vehicle) are increasingly introduced as environmental measures. There are growing expectations in recent years for use of consumer storage batteries, including a storage battery installed as a consumer facility and a storage battery installed in an EV, for ensuring quality of a power system. Patent Literature 1 discloses a technology for controlling charging and discharging of a storage battery of each consumer based on a request for power adjustment, i.e., a request for assurance of quality of a power system, made by a higher-level control system. To more reliably ensure a requested amount of request to ensure quality of a power system, the technology described in Patent Literature 1 calculates a rate of achievement of a charge-discharge command for each consumer using a previous charge-discharge command and an actual value of charging and discharging, and determines reserve power based on the rate of achievement. Then, when the requested amount can be satisfied without using the reserve power, a charge-discharge command is generated for each consumer without use of the reserve power.

CITATION LIST

Patent Literature

Patent Literature 1 Japanese Patent Application Laid-open No. 2020-89087

SUMMARY OF INVENTION

Problem to be Solved by the Invention

However, the requested amount, i.e., the charge-discharge command for ensuring quality of a power system, described in Patent Literature 1 requires a period of transmission of the control command to be, for example, five minutes or the like. The commanded amount is thus determined to eliminate a long-period fluctuation. The technology described in Patent Literature 1 accordingly cannot respond to a rapid change in the power occurring within a short time such as one minute or less, including a rapid change in power generation output in a sunlight power generation facility due to a weather change, a rapid increase in power consumption, and the like. This may produce an overload condition in a device such as a section switchgear or a rectifier in the power system.

The present disclosure has been made in view of the foregoing, and it is an object of the present disclosure to provide a command device capable of preventing an overload condition in a power system.

Means to Solve the Problem

In order to solve the above-described problem and achieve the object, a command device according to the present disclosure includes: a communication unit to receive a first command value, the first command value representing an externally-commanded charge-discharge amount with respect to a storage battery connected to a power system; and a short-period component extraction unit to extract a short-period component of a measurement value with respect to electrical power at an interconnection point of a power control device that controls charging and discharging of the storage battery. The command device further includes an amount-of-control calculation unit to calculate a third command value and to command the power control device to use the third command value, the third command value being a result of addition of the first command value and a second command value, the second command value being generated based on the short-period component.

Effects of the Invention

A command device according to the present disclosure is advantageous in capability of preventing an overload condition in a power system.

BRIEF DESCRIPTION OF DRAWINGS

FIG. 2 is a diagram illustrating an example configuration of a command device of the first embodiment.

FIG. 4 is a flowchart illustrating an example of planning process performed in the central command device of the first embodiment.

FIG. 5 is a flowchart illustrating an example of control command generation process performed in the central command device of the first embodiment.

FIG. 7 is a flowchart illustrating an example of procedure for generating a control command in local control performed in the command device of the first embodiment.

FIG. 14 is a diagram illustrating an example configuration of the power control system of the second embodiment and the power system to be controlled when a storage battery is disposed on the alternating current (AC) aide with respect to a rectifier.

DESCRIPTION OF EMBODIMENTS

A command device, a charge-discharge control system, a power control system, a central command device, a setting value management device, a charge-discharge control method, and a storage medium according to embodiments will be described in detail below with reference to the drawings.

First Embodiment

Figure 1:
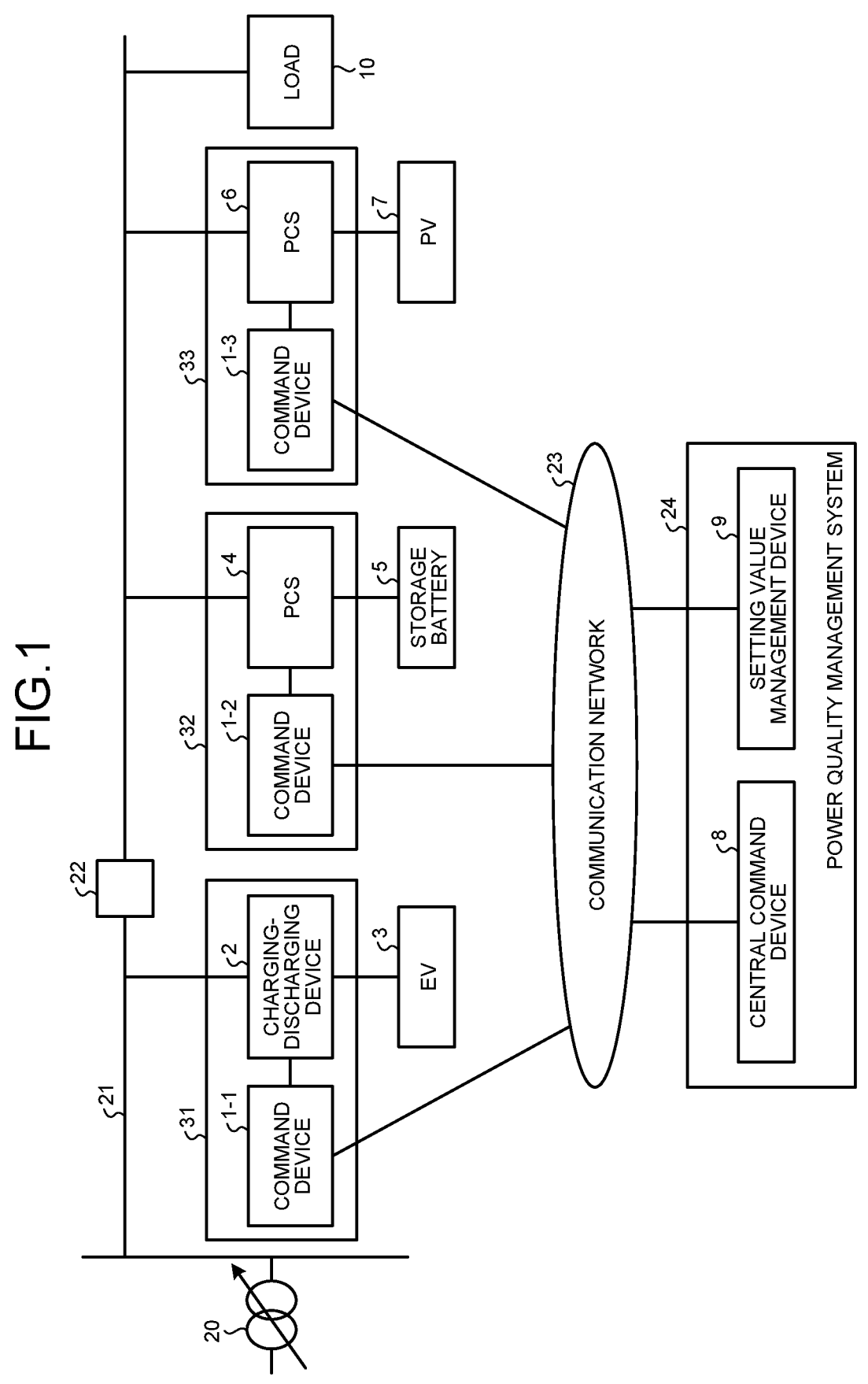
FIG. 1 is a diagram illustrating an example configuration of a power control system according to a first embodiment and a power system to be controlled.

FIG. 1 is a diagram illustrating an example configuration of a power control system according to a first embodiment and a power system to be controlled. In the present embodiment, a power control system includes a power quality management system 24 and command devices 1-1 to 1-3, which are each a local command device. The power control system controls active power in the power system to be controlled. The present embodiment will be described with respect to a power distribution system as an example of the power system to be controlled.

As illustrated in FIG. 1, a power distribution line (hereinafter referred to simply as distribution line) 21 is connected to a distribution transformer 20 via a bus in the power distribution system to be controlled by the power control system. The distribution line 21 is, for example, a high-voltage distribution line having a voltage such as 6600 V. A switchgear 22 serving as a section switchgear segmenting the distribution line 21 is disposed on the distribution line 21. The switchgear 22 is a sensor-integrated switchgear capable of measuring a power flow and a voltage on the distribution line 21. The switchgear 22 transmits measurement information to a central command device 8 and to a setting value management device 9 via a communication network (not illustrated) other than a communication network 23 or via the communication network 23.

The distribution line 21 is also connected with a charging-discharging device 2, which is connectable to an EV 3 to control charging and discharging of a storage battery of the EV 3; a power conditioning subsystem (PCS) (also referred to as power conditioner) 4, which is connected to a storage battery 5 to control charging and discharging of the storage battery 5; a PCS 6, which is connected to a photovoltaic power generation system (PV) (also referred to as sunlight power generation facility) 7 to convert electrical power generated by the PV 7 into alternating current (AC) power; and a load 10, which is a device that consumes electrical power. The charging-discharging device 2, the PCS 4, and the PCS 6 are each a power control device that controls electrical power. The charging-discharging device 2, the EV 3, the PCS 4, the storage battery 5, the PCS 6, and the load 10 are each, for example, a facility managed by a consumer. The term "facility managed by a consumer" may refer to a facility possessed by a consumer and a facility used by a consumer on lease or under another agreement. The storage battery 5 and the storage battery of the BV 3 are each an example of storage battery connected to the power system.

The charging-discharging device 2 is communicatively connected to the command device 1-1. The PCS 4 is communicatively connected to the command device 1-2. The PCS 6 is communicatively connected to the command device 1-3. The charging-discharging device 2 and the command device 1-1 together form a charge-discharge control system 31, which controls charging and discharging of the storage battery of the BV 3. The PCS 4 and the command device 1-2 together form a charge-discharge control system 32, which controls charging and discharging of the storage battery 5. The PCS 6 and the command device 1-3 together form a power generation control system 33, which controls the output power of the PV 7. Although the example illustrated in FIG. 1 is illustrated in which the command devices 1-1 to 1-3 are provided separately from the power control devices respectively corresponding thereto, the command devices 1-1 to 1-3 may each be integrated with a corresponding one of the power control devices. In the case of such integration, the charging-discharging device 2 is a power control unit in the charge-discharge control system 31, the PCS 4 is a power control unit in the charge-discharge control system 32, and the PCS 6 is a power control unit in the power generation control system 33.

Note that FIG. 1 illustrates a case where the number of each of the charge-discharge control system 31, the charge-discharge control system 32, the power generation control system 33, the EV 3, the storage battery 5, the PV 7, and the load 10 is one. However, the numbers of theme components are not particularly limited, and may each be two or more. There may be multiple switchgears 22 installed on the distribution line 21. In addition, there may also be multiple distribution lines 21 connected to the distribution transformer 20. When multiple distribution lines 21 are installed, the switchgear 22 is installed on each of the multiple distribution lines 21, and at least one of the charging-discharging device 2 connectable to the EV 3, the PCS 4 connected to the storage battery 5, the PCS 6 connected to the PV 7, and the load 10 is connected to each of the multiple distribution lines 21. In addition, the charging-discharging device 2, the PCS 4, the PCS 6, and the load 10 are each used with a transformer installed for transforming high-voltage power into low-voltage power having a voltage such as 100 V or 200 V, but these transformers are not illustrated. Note that one or some of the charging-discharging device 2, the PCS 4, the PCS 6, and the load 10 may be connected to the distribution line 21 without using a transformer for transforming high-voltage power into low-voltage power.

The command devices 1-1 to 1-3 can communicate with the power quality management system 24 via the communication network 23. The communication network 23 may be the Internet, another wired or wireless network, or a network including a combination of such networks. The power quality management system 24 manages quality of the distribution line 21 by controlling the voltage and the power flow on the distribution line 21. The power quality management system 24 includes the central command device 6 and the setting value management device 9. The central command device 8 determines an amount of control of power with respect to the charging-discharging device 2, the PCS 4, and the PCS 6 for preventing situations such as voltage violation and overload of the distribution line 21. The central command device 8 then transmits a control command including the amount of control determined, to a corresponding one of the command devices 1-1 to 1-3 via the communication network 23. The central command device 8 transmits the control command with a fixed period of, for example, five minutes or the like. Note that the period of transmission of a control command is not limited to five minutes.

The setting value management device 9 determines setting values, which are control parameters for use in power control performed in each of the charging-discharging device 2, the PCS 4, and the PCS 6. The setting value management device 9 then transmits a set of the setting values to each corresponding one of the command devices 1-1 to 1-3. Note that the command device 1-3 connected to the PCS 6 does not need to perform local control for reducing or eliminating a short-period fluctuation described later. In this case, the setting value management device 9 determines setting values for the command devices 1-1 and 1-2, and transmits a set of the setting values to each corresponding one of the command devices 1-1 and 1-2. The following description will primarily describe an example in which the command devices 1-1 and 1-2 perform local control described later.

The command devices 1-1 to 1-3 each calculate an amount of local control, which is the amount of control for use in local control, based on a measurement value with respect to power at the interconnection point of the corresponding one of the power control devices, using the set of the setting values received from the setting value management device 9. The measurement value with respect to power at the interconnection point is, for example, a voltage. The present embodiment will be described assuming that the measurement value with respect to power at the interconnection point is a voltage at the interconnection point. The command devices 1-1 to 1-3 each transmit, to the corresponding one of the power control devices, an amount of control obtained by adding the amount of local control to an external command value, which is the amount of control required by the control command received from the central command device 8. The amount of local control is an amount of control for reducing or eliminating a short-period fluctuation. The term short period is herein used to represent, for example, a fluctuation having a period of one minute or less, or a rapid change in a short time of one minute or less. The power control devices each control the power of the device connected to that power control device using the amount of control received from the corresponding one of the command devices 1-1 to 1-3. Note that, as described above, the command device 1-3 connected to the PCS 6 does not need to perform local control for reducing or eliminating a short-period fluctuation.

For example, the command device 1-1 extracts a short-period component of the measurement value of the voltage on the primary side, that is, on the distribution line 21 side, measured by the charging-discharging device 2 to determine the amount of short-period fluctuation of the voltage. The command device 1-1 thus calculates the amount of local control for reducing or eliminating the amount of short-period fluctuation. Then, the command device 1-1 transmits, to the charging-discharging device 2, the amount of control obtained by adding the amount of local control to the external command value required by the control command received from the central command device 8. The charging-discharging device 2 controls charging and discharging of the storage battery of the EV 3 using the amount of control received from the command device 1-1.

In addition, the command device 1-2 determines the amount of short-period fluctuation using a measurement value of the voltage on the primary side, that is, on the distribution line 21 side, measured by the PCS 4. The command device 1-2 thus calculates the amount of local control for reducing or eliminating the amount of short-period fluctuation. Then, the command device 1-2 transmits, to the PCS 4, the amount of control obtained by adding the amount of local control to the external command value required by the control command received from the central command device B. The PCS 4 controls charging and discharging of the storage battery 5 using the amount of control received from the command device 1-2.

Moreover, the command device 1-3 determines the amount of short-period fluctuation using a measurement value of the voltage on the primary side, that is, on the distribution line 21 side, measured by the PCS 6. The command device 1-3 thus calculates the amount of local control for reducing or eliminating the amount of short-period fluctuation. Note that, as described above, the command device 1-3 does not need to provide control for reducing or eliminating the amount of short-period fluctuation. In this case, the command device 1-3 commands the PCS 6 to use the external command value itself. Then, the command device 1-3 transmits, to the PCS 6, the amount of control obtained by adding the amount of local control to the external command value required by the control command received from the central command device 9. The PCS 6 controls conversion of the direct current (DC) power output from the PV 7 into AC power, using the amount of control received from the command device 1-3 thus to control the AC power to be output from the PCS 6. Note that although the PCS 6 is also capable of controlling reactive power, the present embodiment will be described in which the command device 1-3 generates the amount of control for controlling active power of the PCS 6, and transmits that amount of control to the PCS 6.

The command devices 1-1 to 1-3 are each hereinafter referred to as command device 1 when the command devices 1-1 to 1-3 are described without distinction. The external command value is, as described above, transmitted every control period of, for example, five minutes or the like. The external command value is calculated to eliminate, in general, a long-period fluctuation having a period longer than the period of the control period. On the contrary, the distribution line 21 may undergo rapid fluctuation in power, including rapid fluctuation in the power generation output of the PV 7. This may cause an overload condition in a facility in the power system much as the switchgear 22 or the distribution line 21. In the present embodiment, as described above, the command device 1 adds together the external command value received from the central command device 8 and the amount of control for reducing or eliminating a short-period fluctuation, determined using a measurement value locally detected at the location corresponding to the command device 1, and transmits the result of addition to the corresponding one of the power control devices as the amount of control. The command device 1 thus can reduce or prevent fluctuation in active power, and can prevent an overload condition in a facility in the power system. The short-period fluctuation, i.e., the short-period component in a measurement value, is a component having a period shorter than the control period, that is, a period such as, for example, one minute or less.

Figure 2:
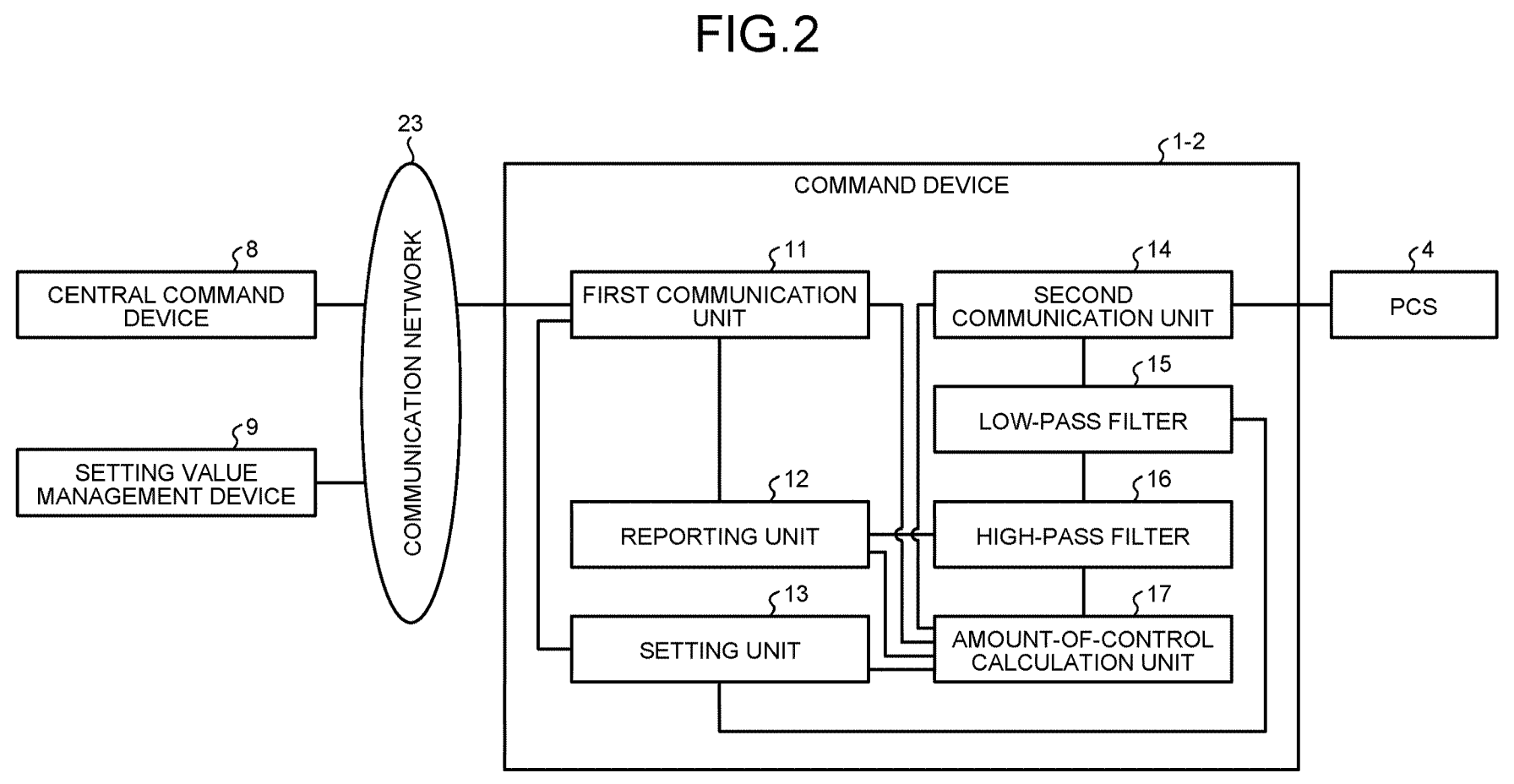

Example configurations of mom of the devices of the present embodiment will next be described. FIG. 2 is a diagram illustrating an example configuration of the command device 1-2 of the present embodiment. Note that although the command device 1-2 is described with reference to FIG. 2 as the example, the command devices 1-1 and 1-3 are configured similarly to the command device 1-2 even though the command devices 1-1 and 1-3 are each connected to a different power control device.

The command device 1-2 includes a first communication unit 11, a reporting unit 12, a setting unit 13, a second communication unit 14, a low-pass filter 15, a high-pass filter 16, and an amount-of-control calculation unit 17.

The first communication unit 11 communicates with the central command device 8 and with the setting value management device 9 via the communication network 23. The first communication unit 11 is a communication unit that receives a first command value representing an externally-commanded charge-discharge amount with respect to the storage battery 5 connected to the power system. Specifically, the first communication unit 11 outputs, to the amount-of-control calculation unit 17, a control command including the first command value, which is an external command value, received from the central command device 8. The first communication unit 11 also outputs the setting values received from the setting value management device 9, to the setting unit 13. In addition, the first communication unit 11 transmits information received from the reporting unit 12 to the setting value management device 9. The first communication unit 11 may also transmit information received from the reporting unit 12 also to the central command device B.

The second communication unit 14 communicates with the PCS 4. The second communication unit 14 receives a measurement value of the voltage on the primary aide of the PCS 4 from the PCS 4, which is the power control device corresponding to the command device 1-2. The second communication unit 14 outputs the measurement value received, to the low-pass filter 15. The measurement value is transmitted periodically. The measurement result is, for example, a one-second average value of the measured voltage, and is transmitted every one second. The period of transmission is not limited to one second, but may be any period that allows a short-period fluctuation to be detected. Note that an example is herein described in which the PCS 4 measures the voltage on the primary side of the PCS 4, but an operation may be performed in which a voltage measurement device for measuring the voltage on the primary side of the PCS 4 is provided separately from the PCS 4, and the second communication unit 14 receives a measurement value from this voltage measurement device, and outputs the measurement value received, to the low-pass filter 15. In addition, when the second communication unit 14 receives a control command for the PCS 4 from the amount-of-control calculation unit 17, the second communication unit 14 transmits the control command to the PCS 4.

The reporting unit 12 temporarily holds information received from the high-pass filter 16 and from the amount-of-control calculation unit 17, and outputs the information being held, to the first communication unit 11 every predetermined reporting period. The information output to the first communication unit 11 by the reporting unit 12, i.e., the information reported to the setting value management device 9 by the command device 1, includes, for example, a time, a measurement value of voltage, and an amount of control of charging-discharging described later. The information to be reported to the setting value management device 9 by the command device 1 will be described in detail later. The setting unit 13 notifies the low-pass filter 15 of a time constant among the setting values received from the first communication unit 11, and notifies the amount-of-control calculation unit 17 of another setting value.

The low-pass filter 15 and the high-pass filter 16 together form a short-period component extraction unit that extracts a short-period component of the measurement value of the voltage of the PCS 4, which controls charging and discharging of the storage battery 5. The low-pass filter 15 performs first-order lag filtering on the measurement result received from the second communication unit 14 using the time constant provided from the setting unit 13 to extract a long-period component, and outputs the long-period component extracted and the measurement value received from the second communication unit 14 to the high-pass filter 16. The high-pass filter 16 subtracts the long-period component from the measurement value of the voltage to extract a short-period component, and outputs the short-period component to the amount-of-control calculation unit 17.

The amount-of-control calculation unit 17 calculates a second command value based on the short-period component received from the high-pass filter 16, using a setting value provided from the setting unit 13, adds together the first command value, which is an external command value, and the second command value to calculate a third command value, and commands the PCS 4 to use the third command value calculated. That is, the amount-of-control calculation unit 17 transmits a control command including the third command value to the PCS 4 via the second communication unit 14. The method of calculating an amount of control will be described in detail later. In the example illustrated in FIG. 2, the amount of control is the charge-discharge amount (i.e., charging-discharging power) for use by the PCS 4, i.e., the charge-discharge amount of the storage battery 5, because the corresponding power control device is the PCS 4. Note that when the corresponding power control device is the charging-discharging device 2, the amount of control is the charge-discharge amount (i.e., charging-discharging power) for use by the charging-discharging device 2, i.e., the charge-discharge amount of the storage battery of the EV 3. When the corresponding power control device is the PCS 6, the amount of control is the amount of control of the power output by the PCS 6. Note that since the PCS 6 is the power control device connected to the PV 7, and the output power from the PCS 6 therefore cannot be increased, the amount of control is an amount of decrease of the output power.

Figure 3:
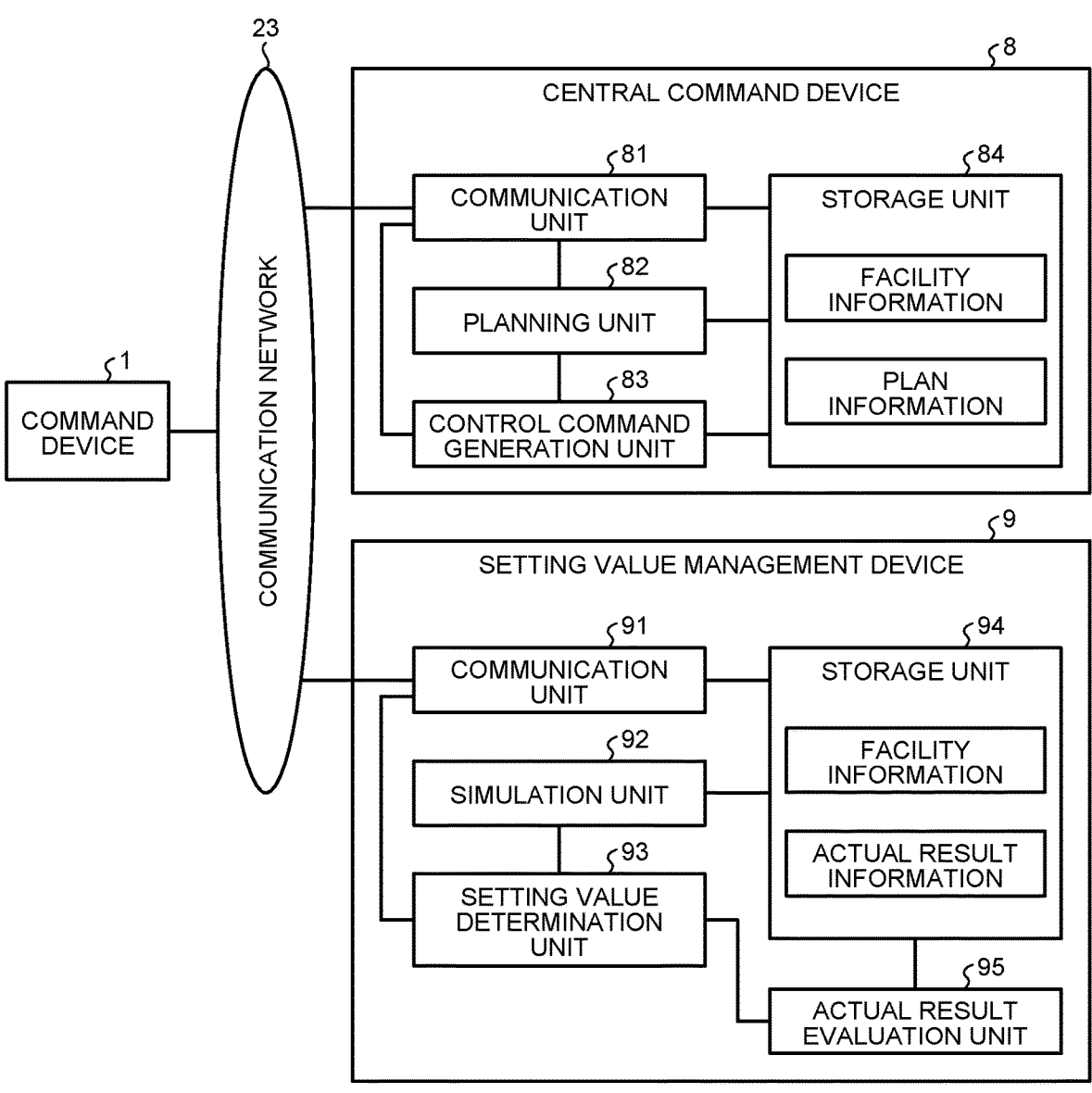
FIG. 3 is a diagram illustrating an example configuration of a central command device and of a setting value management device of the first embodiment.

FIG. 3 is a diagram illustrating an example configuration of the central command device 8 and of the setting value management device 9 of the present embodiment. The central command device 8 includes a communication unit 81, a planning unit 82, a control command generation unit 83, and a storage unit.

The communication unit 81 communicates with the command device 1 via the communication network 23. The communication unit 81 transmits a control command received from the control command generation unit 83 to the command device 1. The communication unit 81 can also communicate with the setting value management device 9 via the communication network 23. In addition, although not illustrated, the communication unit 81 receives measurement information from the switchgear 22, and output the measurement information received, to the control command generation unit 83. Moreover, although not illustrated, when the planning unit 82 is to predict a load power generation quantity (described later) using previous measurement information, the measurement information is stored in the storage unit 94.

The planning unit 82 predicts the amount of load and the power generation quantity in the power distribution system, predicts a voltage distribution in the power distribution system using facility information stored in the storage unit

84, and calculates an amount of control that the central command device 8 is to command each of the command devices 1 to use, using the result of prediction of the voltage distribution. The planning unit 82 generates a supply and demand plan and a control plan reflecting a planned value of the amount of control, which is the calculated amount of control, and stores the supply and demand plan and the control plan in the storage unit 84 as plan information. The facility information includes a rating value, impedance information, and the like with respect to each facility in the power distribution system. The supply and demand plan also includes a charge-discharge plan, which is a plan of the amount of control of charging-discharging with respect to each of the storage battery of the EV 3 and the storage battery 5, and an output reduction plan, which is a plan of reducing the power generation output of the PV 7. The method for generating the supply and command plan will be described later.

The control command generation unit 83 determines the amount of control that the central command device 8 is to command the command device 1 to use, using the plan information stored in the storage unit 84. The control command generation unit 83 then generates a control command including the amount of control determined, as a command value, and transmits the control command to the command device 1 via the communication unit 81. The period of generation of a control command by the control command generation unit 83, that is, the control period to be used by the central command device 8, is, for example, five minutes, but is not limited to five minutes, and may be, for example, three minutes, ten minutes, or the like.

The storage unit 84 stores the facility information and plan information. The facility information may be input by an operator or the like, or may be obtained from another device not illustrated.

The setting value management device 9 includes a communication unit 91, a simulation unit 92, a setting value determination unit 93, a storage unit 94, and an actual result evaluation unit 95.

The communication unit 91 communicates with the command device 1 via the communication network 23. The communication unit 91 transmits a setting value received from the setting value determination unit 93 to the command device 1. In addition, the communication unit 91 stores the information received from the command device 1 in the storage unit 94 as actual result information. The communication unit 91 can also communicate with the central command device 8 via the communication network 23. In addition, although not illustrated, the communication unit 91 receives measurement information from the switchgear 22, and outputs the measurement information received, to the simulation unit 92.

The simulation unit 92 simulates a short-time fluctuation of the power distribution system using the facility information stored in the storage unit 84. For example, in an initial state in which the actual result information has not yet been received from any of the command devices 1, the simulation unit 92 estimates the magnitude and the frequency of a short-period fluctuation caused by a typical sunlight power generation facility using a previous power generation output of a typical sunlight power generation facility, and calculates, through simulation, the magnitude and the frequency of a short-period fluctuation of the voltage and of the current for each power control device corresponding to the applicable command device 1 using the estimation result and using the rating value and the connection location of the facility corresponding to that command device 1. For example, a determination is made, using power flow calculation or the like, of the degree of voltage fluctuation of each of two storage batteries installed at different locations that will be caused by variation in the output of the sunlight power generation facility. The simulation unit 92 notifies the setting value determination unit 93 of the magnitude and the frequency of a short-period fluctuation of each command device 1. The setting value determination unit 93 transmits, to each corresponding one of the command devices 1, an initial value having the initial value of a setting value that has been set using the stimulation result, via the communication unit 91. Alternatively, an operation may be performed in which the simulation unit 92 displays the simulation result, which is then used by the operator to determine an initial value of the setting value, and the setting value determination unit 93 transmits the initial value of the setting value input from the operator to the command device 1. The method for determining the initial value of a setting value is not limited thereto. Instead of execution of a simulation, the operator may envisage the magnitude and the frequency of a short-period fluctuation of power envisaged in the power distribution system, and then set the initial value of each netting value.

In addition, the simulation unit 92 changes the setting value based on an instruction from the setting value determination unit 93, and generates a control model that simulates control performed in the power control device corresponding to each command device 1 using the setting value obtained by the change. The simulation unit 92 then calculates, through simulation, the magnitude and the frequency of a short-period fluctuation of the voltage and of the current for each power control device corresponding to the applicable command device 1, using a planned value of the control command obtained from the central command device 8 via the communication unit 91 and using the control model. The simulation unit 92 notifies the setting value determination unit 93 of the simulation result. The initial value of a short-period fluctuation of power in the power distribution system for use in simulation performed by the simulation unit 92 is set by the operator. For example, the magnitude and the frequency of a short-period fluctuation of the electrical power generated by the PV 7 are each set as an initial value.

The setting value determination unit 93 sets the initial value of a setting value, and transmits the initial value that has been set, to the applicable command device 1 via the communication unit 91. When the setting value determination unit 93 determines that a voltage violation or an overload condition has occurred using the measurement information from the switchgear 22, the setting value determination unit 93 changes the setting value, instructs the simulation unit 92 to perform simulation using the setting value obtained by the change, and repeats changing the setting value and instructing the simulation unit 92 to perform simulation until a simulation result is obtained indicating that no voltage violation and no overload will be caused. The setting value determination unit 93 thus determines a setting value that will cause no voltage violation and no overload, and transmits the setting value determined to the applicable command device 1 via the communication unit 91. When instructed to perform simulation from the actual result evaluation unit 95, the setting value determination unit 93 instructs the simulation unit 92 to perform simulation, and repeats changing the setting value and instructing the simulation unit 92 to perform simulation until a simulation result is obtained indicating that no voltage violation and no overload will be caused. The setting value determination unit 93 thus determines a setting value that will cause no voltage violation and no overload, and transmits the setting value determined to the applicable command device 1 via the communication unit 91. The method for determining the setting value will be described in detail later.

The actual result evaluation unit 95 determines whether the short-period fluctuation assumed in the simulation by the simulation unit 92 is consistent with the actual result information using the actual result information stored in the storage unit 94. When the short-period fluctuation assumed in the simulation and the short-period fluctuation represented by the actual result information differ from each other by a degree greater than or equal to a threshold, the actual result evaluation unit 95 instructs the simulation unit 92 to change the short-period fluctuation assumed in the simulation, and instructs the setting value determination unit 93 to perform simulation again. For example, the simulation unit 92 determine sensitivity representing a ratio of a change in the voltage of the power control device corresponding to each applicable command device 1 relative to a change per 1 kW of a power fluctuation source, and notifies the actual result evaluation unit 95 of the sensitivity. The actual result evaluation unit 95 then estimates, for each command device 1, the magnitude and the frequency of the short-period fluctuation in the power fluctuation source using the voltage measurement result received from the command device 1 and using the sensitivity. When a ratio relative to the value assumed in the simulation differs by a degree greater than or equal to the threshold for one of the magnitude and the frequency estimated of the short-period fluctuation, the actual result evaluation unit 95 changes the value to be assumed in the simulation using the measurement result of the voltage. Note that when there are multiple command devices, the operation may be such that the value to be assumed in the simulation is changed using the measurement result of the voltage when the ratio relative to the value assumed in the simulation differs by a degree greater than or equal to the threshold for one of an average value of the magnitudes and an average value of the frequencies of the short-period fluctuations estimated for the multiple command devices 1.

The storage unit 94 stores the facility information and the actual result information. The facility information may be input by the operator or the like, or may be obtained from another device not illustrated. Note that although FIG. 3 illustrates an example in which the storage unit 84 of the central command device 8 and the storage unit 94 of the setting value management device 9 each store the facility information, a configuration may be used in which a database management device for managing a database is provided separately from the central command device 8 and from the setting value management device 9, the database management device manages the facility information, the actual result information, and the like, and the central command device 8 and the setting value management device 9 read and use an applicable piece of information from the database management device.

An operation of the present embodiment will next be described. First, an operation of the central command device 8 will be described. The central command device 8 performs a planning process to generate the above plan information, and a control command generation process to determine, and command the use of, the amount of control. In the planning process, a supply and demand plan for a fixed future time period, such as for example, next one day, next one week, or next one month, is generated for each time range having a time length, such as for example, 30 minutes. In addition, even on the day when a control command is to be transmitted to the command device 1 of the present embodiment, a plan may be regenerated for a time period from the time range corresponding to that time to the time after the fixed time period.

FIG. 4 is a flowchart illustrating an example of the planning process performed in the central command device 8 of the present embodiment. As illustrated in FIG. 4, the central command device 8 predicts an amount of load and a power generation quantity for a fixed time period (step S1). Specifically, the planning unit 82 predicts a distribution of the load power generation quantity of the power distribution system during a fixed future time period such as next day, for each time range having a time length, such as for example, 30 minutes or 1 hour. The load power generation quantity is equivalent to an amount obtained by subtracting the power generation quantity from a net amount of load. The load power generation quantity represents an amount of load at a positive value, and a power generation quantity at a negative value. The planning unit 92, for example, may determine the load power generation quantity at each point in the power distribution system based on the measurement information from the switchgear 22 previously received and stored in the storage unit 84, may receive predicted values of the amount of load and of the power generation quantity from another device, or may predict a load power generation quantity using an actual value of measurement value from a smart meter (not illustrated), which is a metering device for automatic meter reading. In addition, the planning unit 82 may determine in advance a correlation between the amount of load and the air temperature in a same time range for each day of the week or each type of day (i.e., weekday and holiday), and predict the amount of load using this correlation. The load power generation quantity may be predicted using any standard method, detailed description of which will be omitted. Note that the charge-discharge amount of each of the storage battery 5 and the storage battery of the EV 3 may also be predicted to predict the load power generation quantity to reflect the result of prediction of the charge-discharge amounts.

Next, the central command device 8 determines a usage plan with respect to the storage battery 5 for the fixed time period (step S2). Specifically, when there is a storage battery 5 that can use power discharged from another facility, among the storage batteries 5, the planning unit 82 determines a usage plan of the power stored in that storage battery 5. When there is no storage battery 5 that can use power discharged from another facility, there is no need to perform step S2.

Next, the central command device 8 calculates the power flow (step B3). Specifically, the planning unit 82 calculates the power flow using the facility information stored in the storage unit 84 and using the result of prediction of the load power generation quantity thus to predict a voltage distribution in the power distribution system, and determines the voltage distribution predicted.

Next, the central command device 8 determines an amount of control of active power to prevent a voltage violation (step S4). Specifically, the planning unit 82 determine the amount of control that the central command device 8 is to command each command device to use to reduce the amount of deviation from a proper voltage range of the voltage at the switchgear 22. In this operation, the planning unit 82 determines an amount of control "PC" under a limiting condition where the amount of control PC satisfies Expression (1) using a long-period dischargeable amount PCmax and a long-period chargeable amount PCmin, which are part of the setting values determined by the setting value management device 9. The amount of control PC represents discharging at a positive value, and charging at a negative value. Note that the long-period dischargeable amount PCmax and the long-period chargeable amount PCmin each represent an absolute value. The long-period dischargeable amount PCmax and the long-period chargeable amount PCmin are upper limit values of charging and discharging determined to leave a margin for control to allow the command device 1 to reduce or eliminate a short-period fluctuation by local control. The long-period dischargeable amount PCmax and the long-period chargeable amount PCmin are determined, as described later, by the setting value management device 9 based on, for example, an anticipated magnitude of a short-period fluctuation with respect to the voltage of the power control device to be controlled by the command device 1.

$$PCmax \geq PC \geq -PCmin \qquad (1)$$

For example, the planning unit 92 may determine the amount of control that minimizes the amount of deviation from the proper voltage range by performing power flow calculation multiple times while changing the amount of control that the central command device 8 is to command each command device 1 to use. Alternatively, the planning unit 82 may calculate sensitivity of the amount of control of active power for use in each of the command devices, with respect to a change in the voltage at the switchgear 22, and assign, based on the sensitivity, an amount of control to each applicable command device to reduce the amount of deviation from the proper voltage range. In the cases of the command device 1-1 and the command device 1-2, the amount of control of active power is a value representing the amount of charging-discharging (i.e., charging-discharging power) performed in addition to the charging-discharging operation performed by the corresponding one of the charging-discharging device 2 and the PCS 4 according to an instruction from the consumer of such device. In the case of the command device 1-3, the amount of control of active power is an amount to reduce the active power output by the PCS 6. When there are multiple command devices 1, a constantly fixed amount of control may be assigned to all the command devices 1, or an amount of control may be assigned based on the rating value of the power control device corresponding to each command device 1. There is no particular limitation on the method for determining the amount of control of active power to prevent a voltage violation, and any method may be used.

Next, the central command device 8 determines a supply and demand plan and a control plan (step S5), and terminates the process. Specifically, at step S5, the planning unit 82 determines a supply and demand plan of each time range reflecting the amount of control determined at step S4 and the usage plan determined at step S2. Accordingly, this supply and demand plan includes charge-discharge plans with respect to the storage battery 5 and to the EV 3. In addition, the control plan is a plan that provides the amount of control determined at step S4, of each time range.

A control command generation process of the present embodiment will next be described. FIG. 5 is a flowchart illustrating an example of the control command generation process performed in the central command device 8 of the present embodiment. The central command device 8 receives a measurement value (step S11), and modifies the planned value of the amount of control using the measurement value (step S12). Specifically, the planning unit 82 reads the planned value of the amount of control for the time range corresponding to the present time, from the plan information stored in the storage unit 84, and modifies the planned value read, using the measurement value received from the switchgear 22. For example, when the measurement value of the voltage and the voltage distribution after the control at the time of the generation of the planned value of the amount of control differ from each other by a value greater than or equal to a threshold, the planning unit 82 may modify the planned value by calculating the amount of control again using a latest measurement value according to the procedure illustrated in FIG. 4, or modify the planned value by correcting the planned value of the amount of control according to the difference between the measurement value of the voltage and the voltage distribution after the control at the time of the generation of the planned value of the amount of control. Alternatively, when the measurement value of the voltage received at step B11 falls outside the proper voltage range, the planning unit 82 may correct the amount of control depending on the amount of deviation from the proper voltage range. In addition, for example, consumers connected to each section generated by segmentation of the power distribution system may be grouped into one group, and the planned value of the amount of control may be determined on a per-group basis. In this case, the amount of control that the central command device 8 is to command each command device 1 to use is determined in the control command generation process described later performed on the day of control.

Next, the central command device 8 transmits a control commend including the modified amount of control as a commanded amount, to the command device 1 (step B13), and terminates the process. Specifically, the control command generation unit 83 receives the modified amount of control from the planning unit 82, generates a control command including the modified amount of control as a commanded amount, and transmits the control command to the command device 1 via the communication unit 81.

Figure 6:
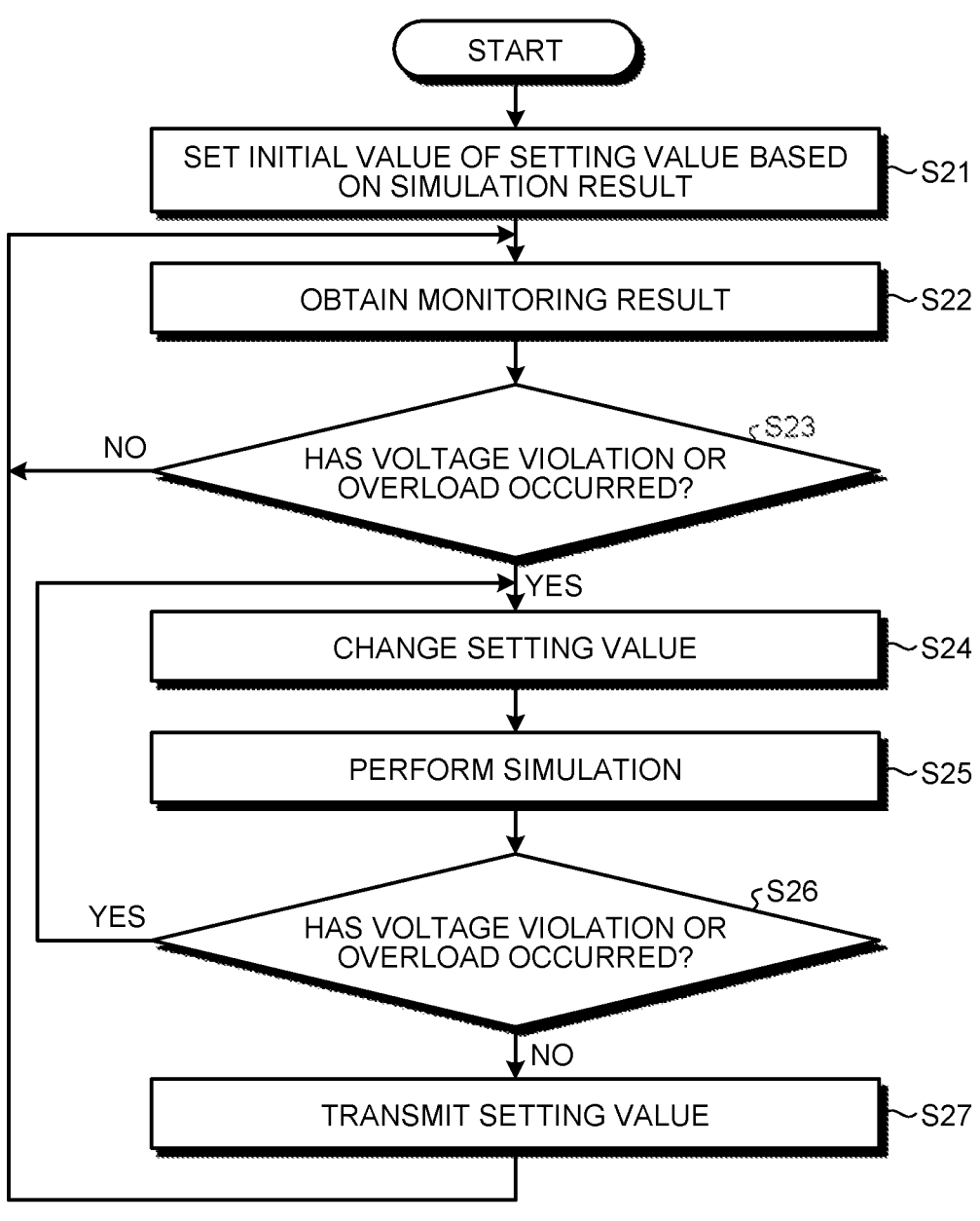
FIG. 6 is a flowchart illustrating an example of setting value determination procedure performed in the setting value management device of the first embodiment.

An operation of the setting value management device 9 will next be described. FIG. 6 is a flowchart illustrating an example of setting value determination procedure performed in the setting value management device 9 of the present embodiment. First, the setting value management device 9 sets an initial value of each setting value based on a simulation result (step S21). Specifically, for example, the simulation unit 92 performs simulation to reflect a short-period fluctuation from the power fluctuation source, which has been set as the initial condition, and displays the simulation result of the voltage and the current corresponding to each command device 1. The operator then sets the initial value of each setting value based on the simulation result.

Note that the setting values include a time constant $\alpha$ for use in first-order lag filtering performed by each command device 1 to extract the long-period component described later; a dead zone width $\beta$ representing the range of dead zone, for which no control is performed; a charge-discharge control sensitivity $\gamma$, which is a coefficient for determining the ratio of a second command value to the external command value, where the second command value is the amount of control for the short-period fluctuation; and the foregoing long-period dischargeable amount PCmax and the foregoing long-period chargeable amount PCmin. The initial values thereof are set, for example, as described below. The time constant $\alpha$ is set taking into consideration the frequency of an anticipated short-period fluctuation. Note that the dead zone width $\beta$ 20 has a positive value, and the dead zone thus ranges from $-\beta$ to $+\beta$. In addition, the time constant $\alpha$ is set to make hunting be unlikely to occur, which also applies to the dead zone width β and the charge-discharge control sensitivity γ. Moreover, the dead zone width β is a value that is set in view of the possibility of occurrence of hunting if control were performed upon occurrence of a smallest short-period fluctuation. As described later, the command device 1 performs no control in response to a short-period fluctuation that falls within the dead zone width β. In addition, considering that the voltage fluctuates to a greater degree at a location nearer to the end of the distribution line 21 in general, the dead zone width β is determined to have a greater value toward the and of the distribution line 21. The charge-discharge control sensitivity γ is determined based on, for example, previous actual values. The long-period dischargeable amount PCmax and the long-period charge-able amount PCmin are determined based on the rating value of each of the power control devices such as the PCS 4 and the charging-discharging device 2. Note that, in the case of the PCS 6, the upper limit value with respect to the output reduction amount is set instead of the long-period discharge-able amount PCmax and the long-period chargeable amount PCmin.

In addition, it is assumed here that the power distribution system is segmented into multiple sections, and that the setting values are determined on a per-section basis. For example, the charge-discharge control sensitivity γ is set to a higher value and the long-period dischargeable amount PCmax and the long-period chargeable amount PCmin are each set to a lower value for a section including many PVs 7 being installed than for a section including few PVs 7 being installed. However, the dead zone width β, the long-period dischargeable amount PCmax, and the long-period chargeable amount PCmin are determined in such a manner that, for example, a ratio to the rating value is determined for each section, and is multiplied by the rating value of the power control device corresponding to each command device 1.

Next, the setting value management device 9 obtains a monitoring result (step S22), and determines whether a voltage violation or an overload condition has occurred, using the monitoring result (step S23). Specifically, the setting value determination unit 93, for example, obtains the measurement information from the switchgear 22 as the monitoring result, and determines whether a voltage viola-tion or an overload condition has occurred, using the mea-surement information. Note that the setting value manage-ment device 9 determines whether a voltage violation or an overload condition has occurred at step S23 in this example, but when the determination on voltage violation is reflected in the control command by the central command device 8, the setting value management device 9 may determine whether an overload condition has occurred at step S23 without making a determination on voltage violation. In addition, the setting value determination unit 93 may also determine whether there is a large amount of hunting at step S23, and may also make a determination of "Yes" at step S23 when there is a large amount of hunting. An the method for determining that there is a large amount of hunting, for example, the actual result evaluation unit 95 may periodi-cally determine that there is a large amount of hunting when a ratio is greater than or equal to a threshold using the measurement value of voltage included in the actual result information stored in the storage unit 94 and using a corresponding command value for the charge-discharge amount, where the ratio is a ratio of an amount of change in the measurement value of voltage in a direction opposite to the direction of the command in a time range after control is performed according to the command value, relative to the amount of change in the voltage corresponding to the command value. Alternatively, the determination that there is a large amount of hunting may be made when the frequency of the measurement value of voltage has changed by an amount greater than or equal to a threshold before and after the control is performed according to the command value. The method for determining that there is a large amount of hunting is not limited to these, but may be any method. When there is a large amount of hunting, the actual result evaluation unit 95 notifies the setting value determi-nation unit 93 of that. Alternatively, an operation may be performed in which the actual result evaluation unit 95 displays the actual result information, with which the opera-tor determines whether there is a large amount of hunting, and when an input is made by the operator indicating that there is a large amount of hunting, the setting value deter-mination unit 93 determines that there is a large amount of hunting.

When a voltage violation or an overload condition has not occurred (No at step S23), the setting value management device 9 repeats step S22. When a voltage violation or an overload condition has occurred (Yes at step S23), the setting value management device 9 changes a setting value (step S24), and performs simulation (step S25). Specifically, the setting value determination unit 93 changes at least one of the setting values, notifies the simulation unit 92 of the at least one of the setting values obtained by the change, and instructs the simulation unit 92 to perform simulation. The simulation unit 92 changes the anticipated power fluctuation amount to cause an overload condition or a voltage violation to occur in simulation at the location where an overload condition or a voltage violation has occurred. Then, the simulation unit 92 generates a control model reflecting the change in the at least one of the setting values from the setting value determination unit 93, performs simulation, and notifies the setting value determination unit 93 of the distributions of the voltage and of the current obtained by simulation.

The setting value determination unit 93 determines whether there is a voltage violation or an overload condition (step S26). When there is no voltage violation and no overload condition (No at step S26), the setting value determination unit 93 transmits the setting values (step S27), and repeats the process from step S22. Specifically, at step S27, the setting value determination unit 93 transmits the time constant α, the dead zone width β, and the charge-discharge control sensitivity γ to the command device 1, and transmits the long-period dischargeable amount PCmax and the long-period chargeable amount PCmin to the central command device 8.

When there is a voltage violation or an overload condition (Yes at step S26), the setting value determination unit 93 repeats the process from step S24. Note that the foregoing example has been described in which one setting value is changed and simulation is then performed to determine a set of setting values that will cause no voltage violation and no overload, but the operation is not limited to this example. The setting values that have been modified may be input by the operator.

An operation performed in the command device 1 will next be described. FIG. 7 is a flowchart illustrating an example of procedure for generating a control command in local control performed in the command device 1 of the present embodiment. As illustrated in FIG. 7, first, the command device 1 extracts a long-period component from the voltage measured (step S31). Specifically, the low-pass filter 15 receives a measurement value V(i) of the voltage on the primary side measured in the power control device from the power control device via the second communication unit 14. The low-pass filter 15 then performs first-order lag filtering expressed by Expression (2) below using the time constant α on the measurement value V(i) to determine a long-period component VL(i), and outputs the long-period component VL (i) and the measurement value V(i) to the high-pass filter 16. Note that the index "i" represents the order of data that is sequentially input, and is an integer greater than or equal to 1. The measurement value V(i) is, for example, a one-second average voltage, and is periodically input to the low-pass filter 15. For example, when the measurement value V(i) is a one-second average voltage and is input to the low-pass filter 15 every second, V(i) is input to the low-pass filter 15 one second afterV(i−1) is input.

$$VL(1)=V(1)$$

$$VL(i)=VL(i-1)\times(1-\alpha)+V(i)\times\alpha(i\geq2) \tag{2}$$

Next, the command device 1 removes the long-period component extracted, from the voltage measured (step S32). Specifically, the high-pass filter 16 determines a short-period component VH(i) according to Expression (3) below. Note that the time constant α is a value ranging from 0 to 1, and a time constant α having a greater value, i.e., a value closer to 1, allows only a shorter-period fluctuation to be extracted. The high-pass filter 16 outputs the short-period component VH(i) determined, to the amount-of-control calculation unit 17. The high-pass filter 16 also outputs the measurement value Y(i) and the short-period component VH(i) to the reporting unit 12.

$$VH(i)=V(i)-VL(i) \tag{3}$$

Next, the command device 1 calculates a short-period voltage fluctuation to be controlled, using the dead zone (step S33). Specifically, the amount-of-control calculation unit 17 determines a short-period voltage fluctuation to be controlled VC(i), according to Expression (4) below using the dead zone width β. That is, when the short-period voltage fluctuation VC(i), which is the short-period component, falls outside the dead zone, the amount of deviation from the range of the dead zone is calculated as the component to be controlled.

$$VC(i)=VH(i)-\beta \text{ for } VH(i)>\beta$$

$$VC(i)=VH(i)+\beta \text{ for } VH(i)<-\beta$$

$$VC(i)=0 \text{ for } \beta\geq VH(i)\geq-\beta \tag{4}$$

Next, the command device 1 calculates a charge-discharge amount using an external command value and using the short-period voltage fluctuation to be controlled, and commands the corresponding power control device to use the charge-discharge amount (step S34). Specifically, the amount-of-control calculation unit 17 calculates a command value P(i), which is the charge-discharge amount that the command device 1 is to command the corresponding power control device to use, according to Expression (5) below, using the abort-period voltage fluctuation to be controlled VC(i), the external command value, and the charge-discharge control sensitivity γ, where the external command value is a command value in the control command received from the central command device S. That is, the amount-of-control calculation unit 17 subtracts, from the first command value, a result of multiplication of a value generated by inverting the positive or negative sign of the short-period voltage fluctuation to be controlled VC(i), by the charge-discharge control sensitivity γ serving as a coefficient thus to calculate the command value P(i), which is a third command value. The amount-of-control calculation unit 17 then transmits a control command including the command value P(i) to the corresponding power control device via the second communication unit 14. Note that when the power control device corresponding to the command device 1 is the PCS 6 controlling the PV 7, the command value is the amount of reduction of output. The amount-of-control calculation unit 17 also outputs the command value P(i) to the reporting unit 12.

$$P(i)=PC-VC(i)\times\gamma \tag{5}$$

The value −VC(i) represents the amount of control to cancel the short-period voltage fluctuation VC(i). The term "−VC(i)×γ" in Expression (5) above therefore corresponds to a short-period command value for cancelling the short-period voltage fluctuation VC(i). Thus, the command value P(i) expressed by Expression (5) above corresponds to a value obtained by adding the short-period command value to an external command value for cancelling the long-period fluctuation. The charge-discharge control sensitivity γ has a value ranging from 0 to 1, and is a value to determine the ratio of the short-period command value to the external command value. Note that a charge-discharge control sensitivity γ having a large value may cause a large amount of hunting. Therefore, the value of the charge-discharge control sensitivity γ is set to avoid a large amount of hunting as described above.

Next, the command device 1 determines whether a reporting period has expired, that is, determines whether a time equivalent to the reporting period has elapsed mince the last reporting (step S35). When the reporting period has not expired (No at step S35), the command device 1 repeats the process from step S32. When the reporting period has expired (Yes at step S35), the command device 1 transmits the actual result information to the setting value management device 9 (step S36), and repeats the process from step S32. Specifically, at step S35, the reporting unit 12 determines whether a time equivalent to the reporting period has elapsed since the last reporting. When a time equivalent to the reporting period has elapsed since the last reporting, the reporting unit 12 transmits, as the actual result information, the measurement value V(i) and the short-period component VH(i) received from the high-pass filter 16 and being held, and the command value P(i) received from the amount-of-control calculation unit 17 and being held, to the setting value management device 9 via the first communication unit 11. The reporting unit 12 thus reports the actual result information to the setting value management device 9. Note that the reporting unit 12 may discard, or store in a storage unit not illustrated, the actual result information that has been transmitted.

As described above, in present embodiment, the command device 1, which is a local command device, commands the voltage control device to use a command value generated by adding, to an external command value that the central command device 8 has commanded the command device 1 to use, a short-period command value for reducing or eliminating a short-period fluctuation using a measurement result of the voltage at a location corresponding to the local point corresponding to the command device 1. The external command value is generated to eliminate a long-period fluctuation having a period such as, for example, 30 minutes or longer, and the period of transmission of the control command is, for example, five minutes or the like. Thus, these operations fail to address a short-period fluctuation. On the contrary, the command device 1 of the present embodiment adds the short-period command value to the external command value in local control, thereby enabling an overload condition to be prevented in the power system.

Figure 8:
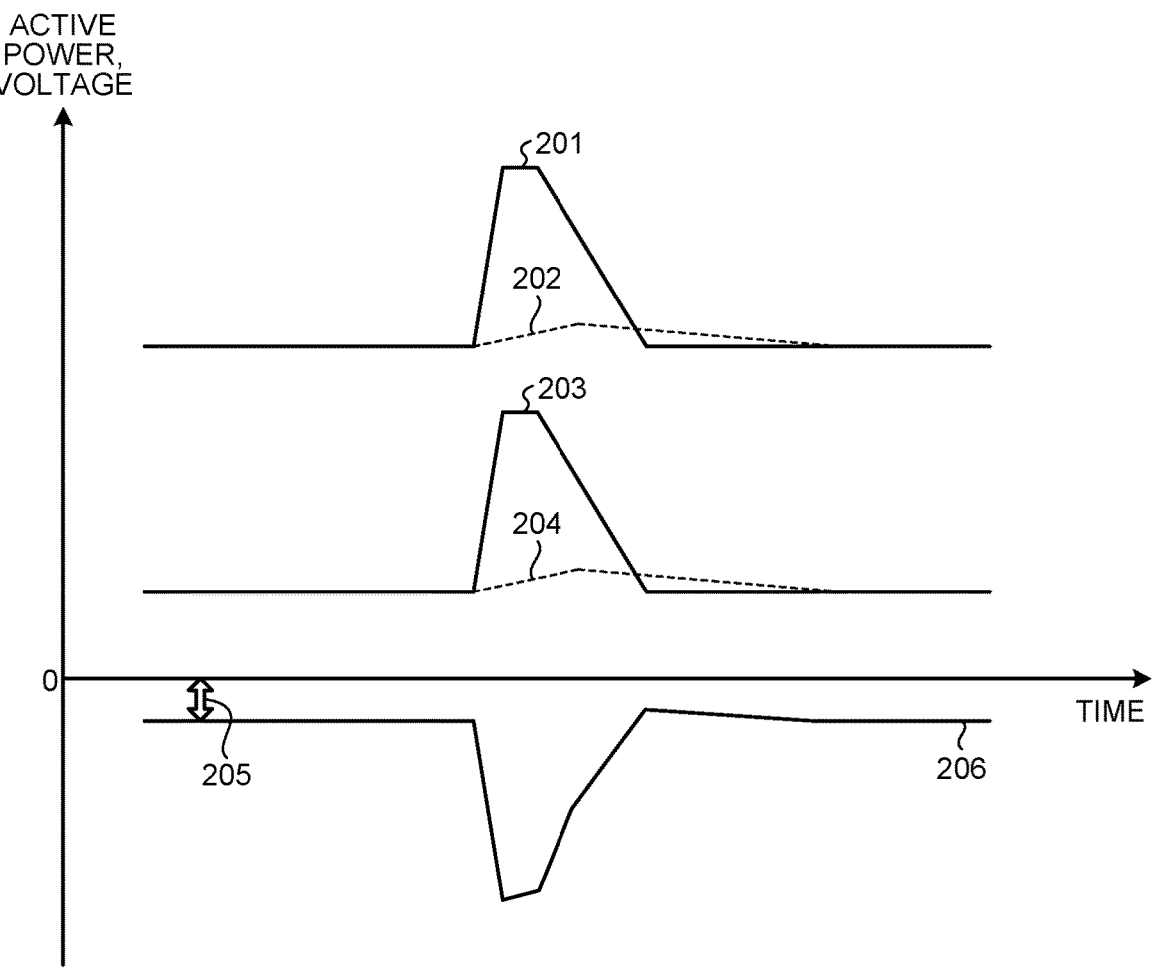
FIG. 8 is a diagram schematically illustrating a relationship between a short-period voltage fluctuation and local control in the first embodiment.

FIG. 8 is a diagram schematically illustrating a relationship between a short-period voltage fluctuation and local control in the present embodiment. FIG. 8 illustrates an example in which the command device 1-2 illustrated in FIG. 1 generates a control command for the PCS 4 to control the PCS 4, and no local control is performed on the PCS 6. In FIG. 8, the horizontal axis represents time, and the vertical axis represents active power or voltage. The positive part of the vertical axis represents a voltage rise or active power reversely flowing into the distribution line 21. The negative part of the vertical axis represents a voltage drop or active power supplied from the distribution line 21. It is assumed that a rapid increase in the power generated by the PV 7 illustrated in FIG. 1 has caused a rapid increase in power of the reverse power flow from the PCS 6 to the distribution line 21. A voltage 201 is the voltage on the primary side of the PCS 4 in a comparative example in which the command device 1-2 provides no local control, and an increase in the power of the reverse power flow from the PCS 6 has caused a rapid increase in the voltage. In addition, active power 203 is the active power in the switchgear 22 in the comparative example in which the command device 1-2 provides no local control, and the increase in the power of the reverse power flow from the PCS 6 has also caused a rapid increase in the active power in the switchgear 22, i.e., a rapid increase in the current flowing through the switchgear 22. This my cause an overload condition.

In contrast, a voltage 202 represents an average voltage on the primary side of the PCS 4 when the command device 1-2 has performed the local control of the present embodiment. Active power 206 represents the active power in the PCS 4 when the local control of the present embodiment has been performed. Active power 204 represents the active power in the switchgear 22 when the local control of the present embodiment has been performed. An external command value 205 is the command value in the control command received by the command device 1-2 from the central command device 8. In the present embodiment, the rapid increase in the voltage 202 is detected as a short-period fluctuation, and a short-period command is added to the command value associated with the PCS 4. Thus, the command value for the PCS 4 is generated to increase the charge amount to a value greater than the external command value 205. This causes the PCS 4 to increase the charge amount of the storage battery 5, thereby causing an increase in the active power supplied from the distribution line 21 to the storage battery 5 as indicated by the active power 206. This reduces the active power 204, which is the active power in the switchgear 22, to lens than the active power 203, thereby enabling overload of the switchgear 22 to be prevented. Note that the voltage 202 repeats a rapid increase and a decrease in shorter periods, but FIG. 8 illustrates an averaged value.

Note that when the command device 1-3 connected to the PCS 6 performs local control, a power generation loss will occur in power generation of the PV 7. However, the PCS 6 generally stops operation for a certain time period when the voltage has increased to exceed a threshold. The loss caused by output reduction due to the local control of the present embodiment will be lower than the loss caused by power generation stop due to the above stop of operation for the certain time period.

Figure 9:
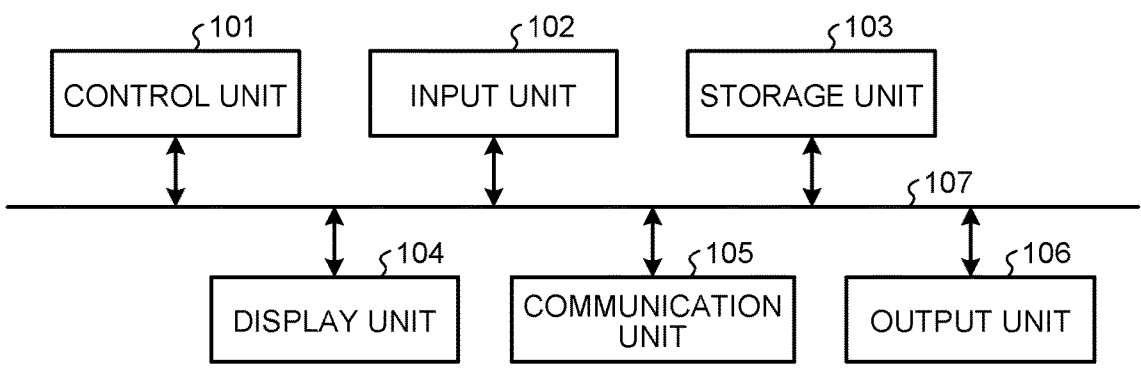
FIG. 9 is a diagram illustrating an example configuration of a computer system implementing the command device, the central command device, and the setting value management device of the first embodiment.

An example hardware configuration of the command devices 1, the central command device 8, and the setting value management device 9 of the present embodiment will next be described. FIG. 9 is a diagram illustrating an example configuration of a computer system implementing the command devices 1, the central command device 8, and the setting value management device 9 of the present embodiment. The central command device 8 and the setting value management device 9 are each implemented in, for example, a computer system exemplified in FIG. 9.

As illustrated in FIG. 9, thin computer system includes a control unit 101, an input unit 102, a storage unit 103, a display unit 104, a communication unit 105, and an output unit 106, which are connected to one another via a system bus 107. In FIG. 9, the control unit 101 is, for example, a central processing unit (CPU) or the like, and executes a program describing a process to be performed in the central command device 8 and in the setting value management device 9 of the present embodiment. The input unit 102 includes, for example, a keyboard, a mouse, and/or the like, and is used by a user of the computer system to input various types of information. The storage unit 103 includes various types of memories such as a random access memory (RAN) and a read-only memory (ROM), and a storage device such as a hard disk drive. The storage unit 103 stores a program to be executed by the above control unit 101, necessary data obtained during a process, and the like. The storage unit 103 is also used as a temporary storage area for a program. The display unit 104 includes a liquid crystal display panel (LCD) and the like to display various types of screens to a user of the computer system. The communication unit 105 includes a receiver and a transmitter for performing communication processing. The output unit 106 is a printer and/or the like.

A description will now be given of an example operation of the computer system until programs for respectively implementing the central command device 8 and the setting value management device 9 of the present embodiment become executable. In a computer system configured as described above, a program is installed in the storage unit 103 from, for example, a compact disc (CD)-ROM or a digital versatile disc (DVD)-ROM placed in a CD-RON drive or in a DVD-ROM drive not illustrated. Then, upon execution of the program, the program read from the storage unit 103 is loaded to the storage unit 103. Under this condition, the control unit 101 performs a process that functions as the central command device 8 or the setting value management device 9 of the present embodiment, according to the program loaded to the storage unit 103.

Note that the foregoing description has been described in which a program describing a process is provided using a CD-ROM or a DVD-ROK as the recording medium, but the method for providing a program is not limited thereto. A program provided using, for example, a transmission medium such as the Internet via the communication unit 105 may be used depending on the configuration of the computer system, the size of the program provided, or the like.

The first communication unit 11 and the second communication unit 14 illustrated in FIG. 2 are implemented by, for example, the communication unit 105 illustrated in FIG. 9. The communication units 81 and 91 illustrated in FIG. 3 are implemented by, for example, the communication unit 105 illustrated in FIG. 9. The reporting unit 12, the setting unit 13, the low-pass filter 15, the high-pass filter 16, and the amount-of-control calculation unit 17 illustrated in FIG. 2 are implemented by the control unit 101 by executing a corresponding program. The planning unit 82, the control command generation unit 83, the simulation unit 92, the setting value determination unit 93, and the actual result evaluation unit 95 illustrated in FIG. 3 are implemented by the control unit 101 by executing a corresponding program. In addition, the storage unit 103 is also used when the control unit 101 executes a program.

The storage units 84 and 94 illustrated in FIG. 3 are implemented by the storage unit 103 illustrated in FIG. 9. The setting value determination unit 93 is implemented also using the input unit 102. In addition, when the simulation unit 92 displays a simulation result, the simulation unit 92 may be implemented also using the display unit 104 illustrated in FIG. 9. The simulation unit 92 may alternatively display a simulation result by transmitting the simulation result to another display device. The configuration of the computer system is not limited to the example illustrated in FIG. 9. For example, the output unit 106 may be not included in the computer system. In addition, the display unit 104 and the input unit 102 may be not included in a computer system for implementing the command device 1.

Moreover, the command devices 1, the central command device 8, and the setting value management device 9 of the present embodiment may each be implemented in a single computer system or in multiple computer systems. For example, the central command device 8 and the setting value management device 9 my be implemented in a cloud system. In addition, the central command device 8 and the setting value management device 9 may be implemented in a single computer system.

A program of the present embodiment causes, for example, a computer system to perform a step of receiving a first command value representing an externally-commanded charge-discharge amount with respect to a storage battery connected to a power system, a step of extracting a short-period component of a measurement value with respect to power at an interconnection point of a power control device that controls charging and discharging of the storage battery, and a step of calculating a third command value by addition of the first commend value and a second command value generated based on the short-period component, and commanding the power control device to use the third command value.

As described above, in the present embodiment, the command device 1 adds a short-period command value for reducing or eliminating a short-period fluctuation based on a measurement value of the voltage at a local point corresponding to the command device 1, to an external command value, which is a command value in the control command received from the central contend device 8. The command device 1 then commands the power control device corresponding to the command device 1 to use the result of addition. This can prevent overload in the power system even when a short-period fluctuation of power has occurred.

Second Embodiment

Figure 10:
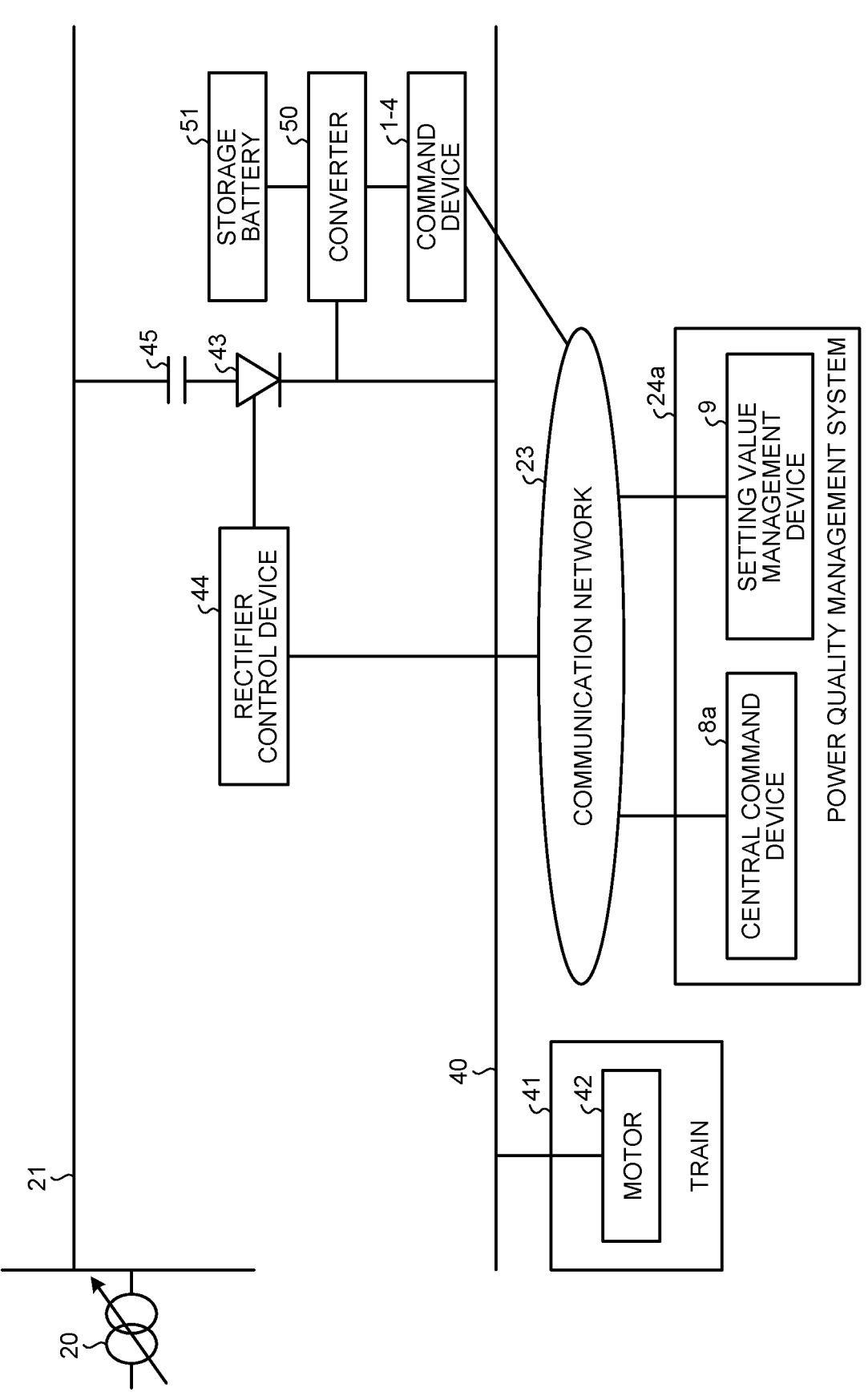
FIG. 10 is a diagram illustrating an example configuration of a power control system according to a second embodiment and a power system to be controlled.

FIG. 10 is a diagram illustrating an example configuration of a power control system according to a second embodiment and a power system to be controlled. The present embodiment will be described with respect to an example in which the power system to be controlled by the power control system includes a feeder line 40, which supplies electrical power to a train 41 and is supplied with regenerative power from the train 41, where the train 41 is an electric vehicle in a railway system. In the present embodiment, the power control system includes a power quality management system 24a in place of the power quality management system 24, and includes a command device 1-4, which is a local command device. The power quality management system 24a of the present embodiment includes a central command device 8a and the setting value management device 9 similar to the setting value management device 9 of the first embodiment. Note that although not illustrated, the distribution line 21 is connected, similarly to the first embodiment, with the charging-discharging device 2 capable of charging and discharging the storage battery of the KV 3, the PCS 4 connected to the storage battery 5, the PCS 6 connected to the PV 7, and the load 10. In addition, the charging-discharging device 2, the PCS 4, and the PCS 6 are respectively connected with the command devices 1-1, 1-2, and 1-3. Components having functionality similar to the functionality of the first embodiment are designated by reference characters same as the reference characters of the first embodiment, and description thereof will be omitted. The following description will primarily describe differences from the first embodiment.

The feeder line 40 is, for example, a DC feeder line having a voltage such as 1500 V. The train 41 includes a motor 42. The train 41 travels in such a manner that the motor 42 rotates wheels (not illustrated) using power supplied from the feeder line 40. During power running of the train 41, power is supplied from the feeder line 40 to the train 41 with a rapid change. In addition, during deceleration of the train 41, regenerative power from the motor 42 is supplied to the feeder line 40. Although FIG. 10 illustrates a single train 41, it is typical that multiple trains 41 are connected to the feeder line 40, and the number of the trains 41 is not limited to the example illustrated in FIG. 10.

As illustrated in FIG. 10, the feeder line 40 is supplied with DC power having a voltage such as 1500 V via a transformer 45, which transforms a voltage of the distribution line 21 of a high-voltage system having a voltage such as 6600 kV, and via a rectifier 43, which converts AC power into DC power. The rectifier 43 is controlled by a rectifier control device 44. The rectifier control device 44 measures power output from the rectifier 43, and transmits the measurement result to the central command device 8a as actual result information. Note that the voltage of the feeder line 40 is not limited to 1500 V. In addition, the transformer 45 may be not installed.

On the feeder line 40, regenerative power from the train 41 is used by another train 41 in power running and/or the like, and excess power is stored in a storage battery 51. This enables the regenerative power to be effectively utilized by operations such as consumption by the load 10 on the distribution line 21 and the like, and storage in the storage battery 5. Generation of regenerative power causes instantaneous high power to be supplied to the distribution line 21, thereby providing a possibility of overload on the distribution line 21. Also in the present embodiment, performing the local control described in the first embodiment by the command devices 1-1 and 1-2 similarly to the first embodiment, or by the command devices 1-1 to 1-3, enables overload to be prevented.

In the present embodiment, the storage battery 51 is connected between the rectifier 43 connected to the feeder system and the feeder line 40. Specifically, a converter 50 for charging and discharging the storage battery 51 is provided between the feeder line 40 and the rectifier 43. The central command device 8a generates a plan to use power for discharging the storage battery 51 in a time range when a large amount of power will be consumed in the feeder system, using the storage battery 51, and controls charging and discharging of the storage battery 51 according to the plan, thereby preventing occurrence of overload in the rectifier 43 and in the transformer 45. In addition, during power running of the train 41, a rapid fluctuation in power occurs, and the short-period rapid fluctuation in power due to power running cannot be addressed by only a control command from the central command device 8a. In contrast, in the present embodiment, occurrence of overload due to a short-period fluctuation is prevented by connecting the command device 1-4 to the converter 50. The converter 50 measures the voltage on the feeder system side, transmits the measurement result to the command device 1-4, and controls charging and discharging of the storage battery 51 based on a control command from the command device 1-4. The command device 1-4 is configured similarly to the command devices 1 described in the first embodiment, and operates similarly to the command devices 1 of the first embodiment. That is, the converter 50 is an example of the power control device connected to the command device 1 similarly to the charging-discharging device 2, the PCS 4, and the PCS 6 for the command devices 1. In addition, FIG. 10 illustrates a case where the number of each of the transformer 45, the rectifier control device 44, the rectifier 43, the converter 50, the storage battery 51, and the command device 1-4 is one, but multiple sets of these components may be included.

In addition, regenerative power from the train 41 on the feeder line 40 is consumed by another train 41 in power running and/or the like, and excess power is stored in the storage battery 51. When power is generated in an amount more than the amount that can be stored in the storage battery 51, the command device 1-4 performs control to reduce or eliminate a short-period fluctuation similarly to the case of power running, in addition to performing control based on the control command from the central command device 8a. This enables the regenerative power to be collected by the storage battery 51 for effective usage.

Figure 11:
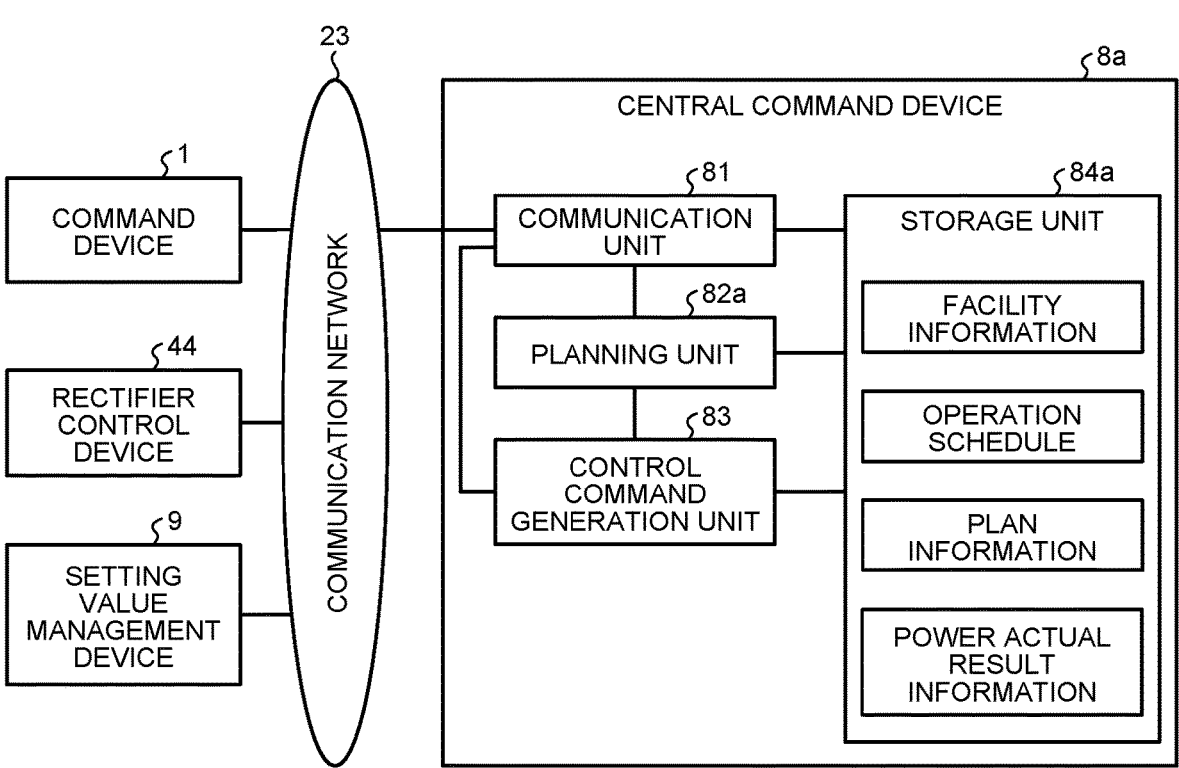
FIG. 11 is a diagram illustrating an example configuration of a central command device of the second embodiment.

The central command device 8a of the present embodiment will next be described. FIG. 11 is a diagram illustrating an example configuration of the central command device 8a of the present embodiment. The central command device 8a includes a planning unit 82a and a storage unit 84a in place of the planning unit 82 and the storage unit 84 of the central command device 8 of the first embodiment. The communication unit 81 is similar to the communication unit 81 of the first embodiment, and in the present embodiment, additionally receives actual result information from the rectifier control device 44, and stores the actual result information in the storage unit 84a as power actual result information. The control command generation unit 83 is similar to the control command generation unit 83 the first embodiment.

The storage unit 84a stores the facility information, an operation schedule, the plan information, and the power actual result information. The facility information is similar to the facility information of the first embodiment, and in the present embodiment, further includes information about facilities in the feeder system. Similarly, the plan information is similar to the plan information of the first embodiment, and in the present embodiment, further includes plan information about facilities in the feeder system. The operation schedule is the operation schedule of the train 41. The power actual result information is, as described above, actual result information transmitted from the rectifier control device 44. Note that when no power actual result information is used in prediction of power consumed in the feeder system described later, the storage unit 84a does not need to store the power actual result information, and thus the rectifier control device 44 does not need to transmit the actual result information.

An operation of the planning unit 82a will next be described. The planning unit 82a generates the supply and demand plan and the control plan. In the present embodiment, the planning unit 82a generates the supply and demand plan and the control plan also taking into consideration power-running power, which is power used in the feeder system during power running, and regenerative power.

Figure 12:
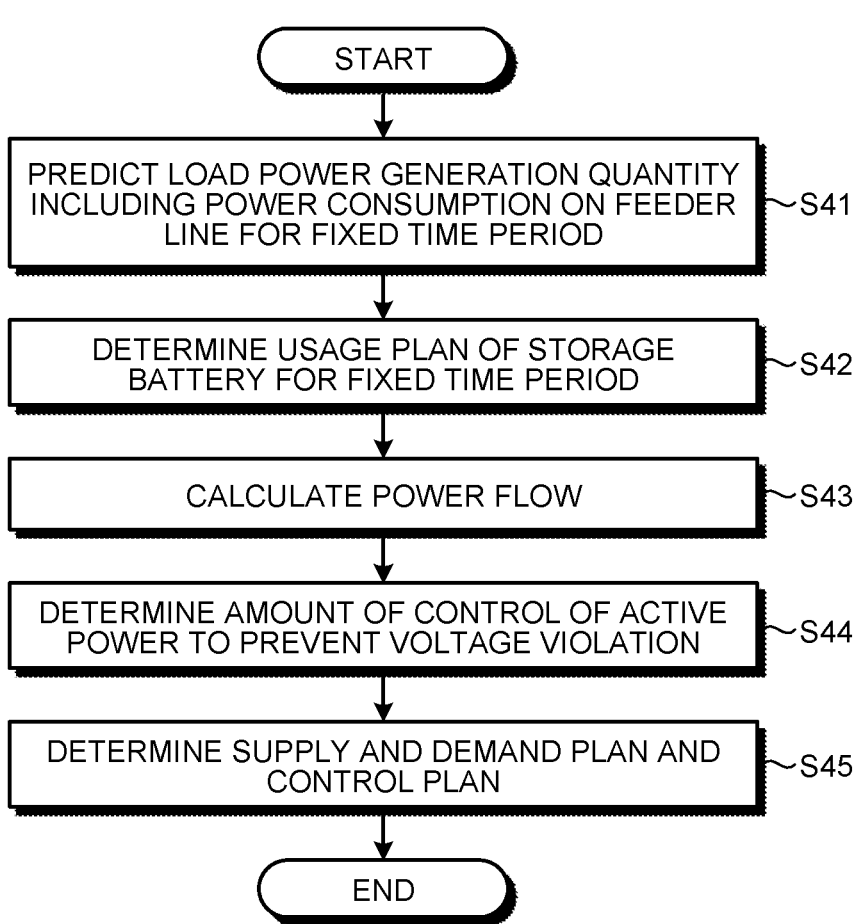
FIG. 12 is a flowchart illustrating an example of planning procedure performed in a planning unit of the second embodiment.

FIG. 12 is a flowchart illustrating an example of planning procedure performed in the planning unit 82a of the present embodiment. As illustrated in FIG. 12, the planning unit 82a predicts the load power generation quantity including power consumption on the feeder line for a fixed time period (step S41). Specifically, the planning unit 82a predicts power consumption obtained by subtracting regenerative power from power-running power for each time range having a length of, for example, 30 minutes, for each day of the week, each type of day (i.e., weekday and holiday), or the like using the power actual result information, which is the actual result information received from the rectifier control device 44. Alternatively, the planning unit 82a simulates the power-running power and the regenerative power based on the operation schedule stored in the storage unit 84a to predict the power-running power and the regenerative power of each time range, and thus predicts power consumption obtained by subtracting the regenerative power from the power-running power. The planning unit 82a predicts a load power generation quantity of a portion other than the feeder system similarly to the first embodiment.

Next, the planning unit 82a determines the usage plan with respect to the storage battery for the fixed time period (step S42). Specifically, the planning unit 82a generates the usage plan with respect to the storage battery 51 to, for example, reduce the peak value of the power consumption in the feeder system. For example, the storage battery 51 is charged in a time range when power consumption in the feeder system is low during am day, and the storage battery 51 is discharged in a time range when power consumption in the feeder system is high during one day to allow discharged electricity to be used in power running of the train 41. This enables an overload condition to be prevented in the transformer 45, the rectifier 43, and the like in the feeder system. The storage battery 5 is similar to the storage battery 5 of the first embodiment.

The operation thereafter at steps S43 to S45 is similar to the operation at S3 to S5 of the first embodiment with an exception that the supply and demand plan generated at step S45 further includes a charge-discharge plan with respect to the storage battery 51, and the control plan further includes the amount of control with respect to the command device 1-4 connected to the converter 50, which controls charging and discharging of the storage battery 51.

The control command generation unit 83 generates a control command using the plan information, and transmits the control command to each corresponding command device 1 similarly to the first embodiment.

Figure 13:
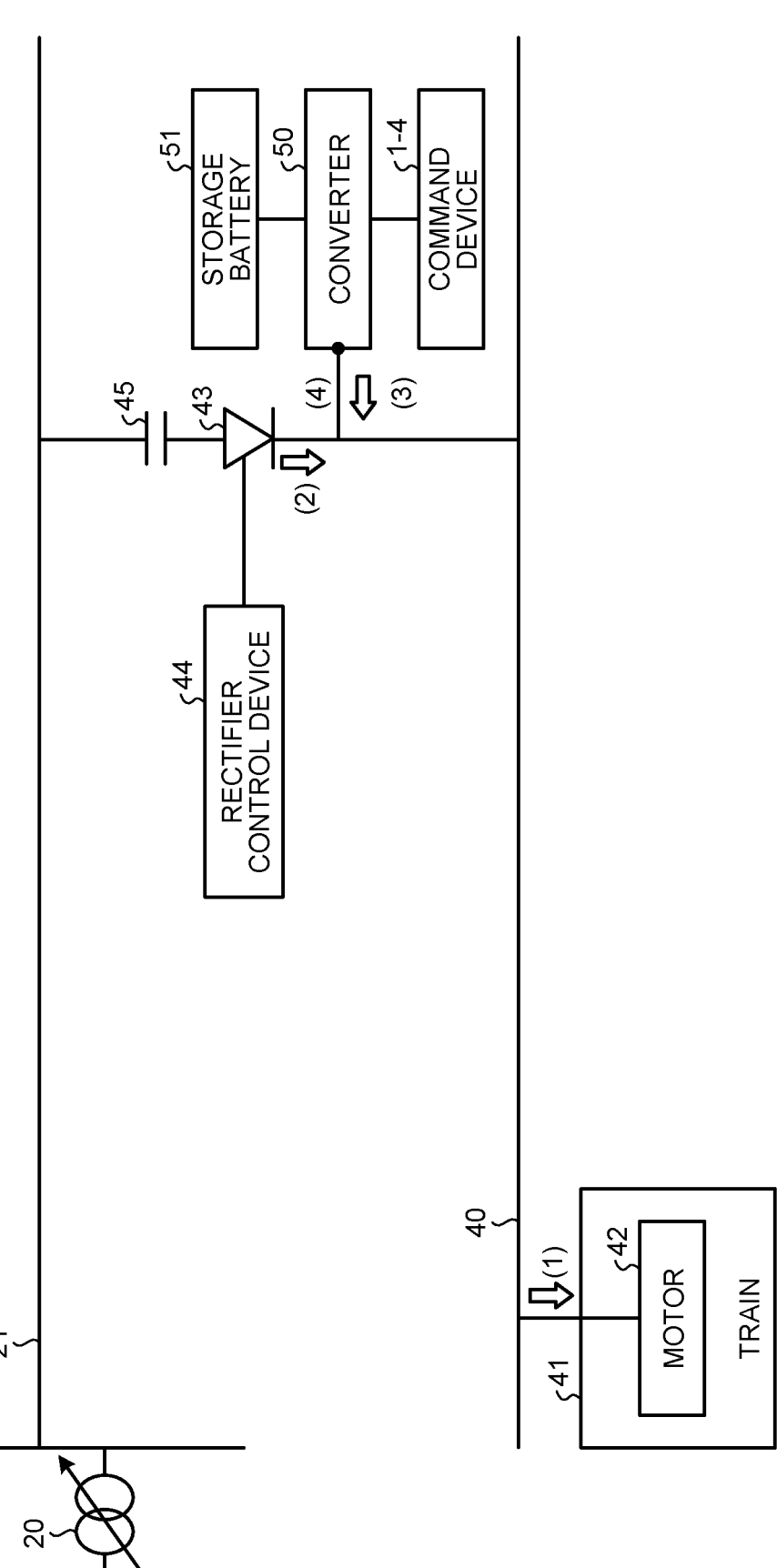
FIG. 13 is a diagram for describing reduction or elimination of a short-period fluctuation during power running of a train in the second embodiment.

FIG. 13 is a diagram for describing reduction or elimination of a short-period fluctuation during power running of the train 41 in the present embodiment. FIG. 13 illustrates portions related to the feeder system, and omits illustration of the power quality management system 24a and the like. First, as indicated by index (1), power consumed by the train 41 due to power running of the train 41 increases rapidly. This causes the voltage of the converter 50 indicated by index (4) to drop rapidly, thereby causing the absolute value of the short-period component VH(i) to exceed the dead zone width $\beta$. In response to this, the command device 1-4 generates a control command to reduce or eliminate the short-period fluctuation, and transmits the control command to the converter 50. This causes the converter 50 to discharge the storage battery 51 as indicated by index (3). When the command device 1-4 provides no local control, a rapid increase in the power consumed at the position indicated by index (1) causes a rapid increase in active power of the rectifier 43 indicated by index (2). In contrast, local control performed by the command device 1-4 causes discharge of the storage battery 51 indicated by index (3). This can prevent an increase in the active power of the rectifier 43, thereby enabling an overload condition to be prevented in the rectifier 43 and in the transformer 45.

In addition, the foregoing example has been described in which the command device 1-4 performs local control using the voltage of the converter 50. However, when the rectifier 43 and the storage battery 51 are disposed at a same location such as in an electric power substation, the command device 1-4 can also perform local control using a measurement value of the active power of the rectifier 43. That is, the measurement value with respect to the power at the interconnection point of the converter 50, which is a power control device, may be a measurement value of the active power in the rectifier 43. In this case, the command device 1-4 obtains a measurement result of the active power of the rectifier 43, and performs local control similarly to the first embodiment using information on the active power of the rectifier 43 instead of using the voltage of the converter 50. Also in this case, when the power consumed by the train 41 increases rapidly due to power running of the train 41, the active power of the rectifier 43 indicated by index (2) increases. This causes the command device 1-4 to perform local control to discharge the storage battery 51 as indicated by index (3) as illustrated in FIG. 13, thereby enabling a rapid increase in the active power of the rectifier 43 indicated by index (2) to be prevented.

Figure 14:
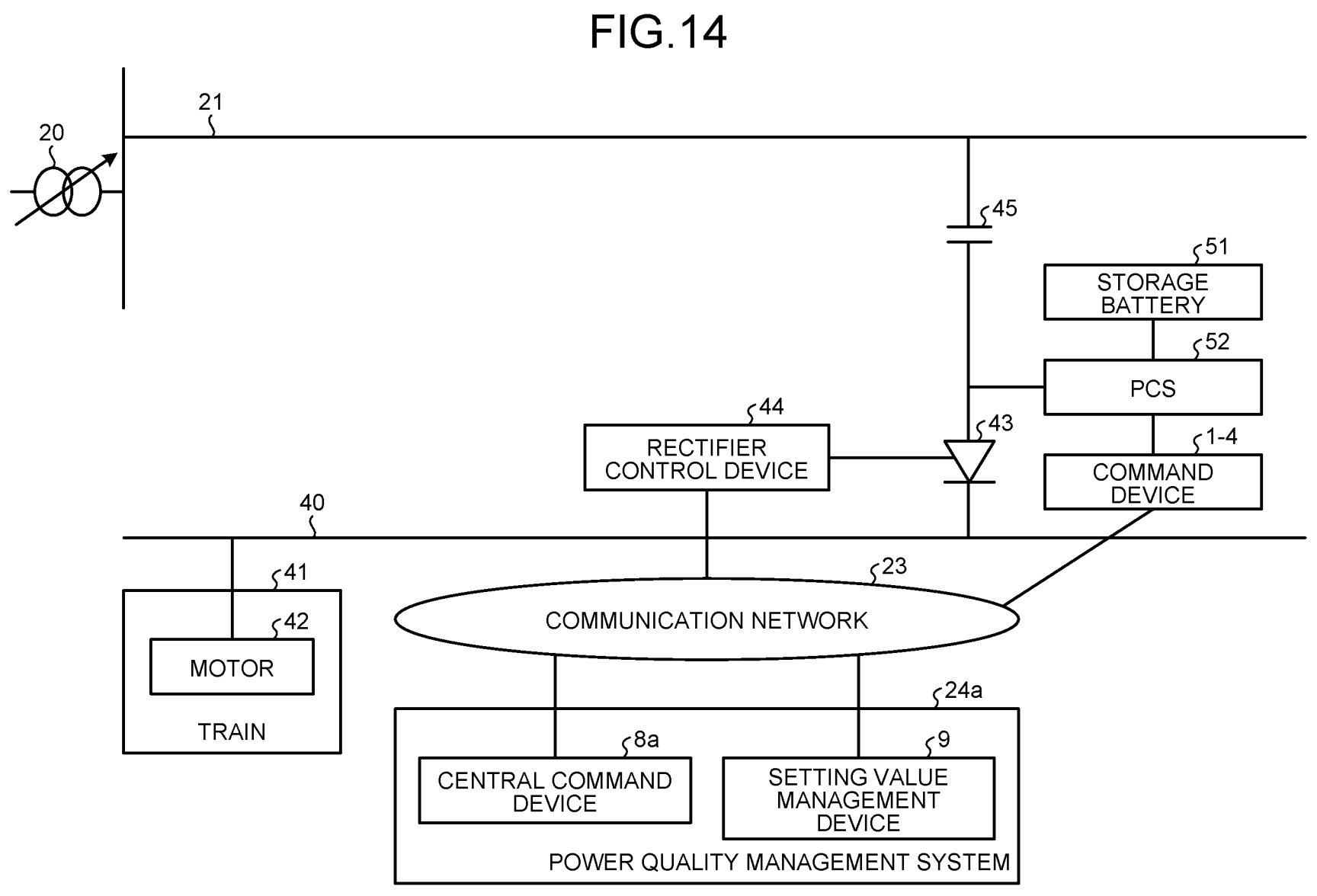

Moreover, the example illustrated in FIGS. 10 and 13 assumes that the storage battery 51 is disposed an the DC side with respect to the rectifier 43. However, the storage battery 51 may be disposed between the rectifier 43 and the transformer 45. FIG. 14 is a diagram illustrating an example configuration of the power control system of the present embodiment and the power system to be controlled when the storage battery 51 is disposed on the AC side with respect to the rectifier 43. In the example illustrated in FIG. 14, a PCS 52, which is a power control device that controls charging and discharging of the storage battery 51, is connected between the rectifier 43 and the transformer 45. The PCS 52 is connected to the command device 1-4. The example illustrated in FIG. 14 includes the PCS 52 for conversion between AC power and DC power in place of the converter 50 illustrated in FIG. 10 to allow the storage battery 51 to be connected to an AC section. The other part of the configuration is similar to the example illustrated in FIG. 10. Note that in this case, the command device 1-4 obtains a measurement value of the active power of the transformer 45, and performs local control using the measurement value of the active power of the transformer 45. That is, the measurement value with respect to the power at the interconnection point of the PCS 52, which is a power control device, may be the active power in the transformer 45. Also in this case, when the power consumed by the train 41 increases rapidly due to power running of the train 41, the active power of the transformer 45 increases, and the storage battery 51 is then discharged through local control. This can prevent a rapid increase in the active power of the transformer 45.

Furthermore, the foregoing example has been described primarily with respect to a power running operation. However, when a fluctuation in the regenerative power from the feeder line 40 will affect the distribution line 21, such as when the storage battery 51 is not installed, the set of the command devices 1-1 and 1-2 or the set of the command devices 1-1 to 1-3 enables overload on the distribution line 21 to be prevented and the regenerative power to be effectively utilized similarly to the first embodiment by performing the local control described in the first embodiment. Note that when a PCS for transmitting regenerative power from the feeder line 40 to the distribution line 21 is installed, and the regenerative power is accordingly transmitted to the distribution line 21, the storage battery 5 and the PCS 4 connected to the distribution line 21 are desirably disposed near the PCS provided for transmitting the regenerative power.

The central command device 8a of the present embodiment is implemented in a computer system similarly to the central command device 8 of the first embodiment.

Note that the foregoing example has been described with respect to an example in which the power system to be controlled by the power control system of the present embodiment includes both a feeder system and a power distribution system. However, the power control system of the present embodiment may control only a feeder system. In addition, although the foregoing example assumes that the feeder system is a DC system, the power control system of the present embodiment can provide similar control also when the feeder system is an AC system.

As described above, in the present embodiment, the command device provides control to reduce or eliminate a short-period fluctuation similarly to the first embodiment when regenerative power from the train 41 is supplied in a feeder system, thereby enabling prevention of an overload condition caused by a rapid change in power due to regenerative power. In addition, the storage battery 51 is installed to prevent an overload condition during power running to reduce the peak value of the power in the feeder system using the storage battery 51, and moreover, the command device 1-4 generates a control command for reducing or eliminating a short-period fluctuation, and commands the power control device that controls charging and discharging of the storage battery 51 to follow the control command. This can prevent an overload condition similarly to the first embodiment.

The configurations described in the foregoing embodiments are merely examples. These configurations may be combined with a known other technology, and configurations of different embodiments may be combined together. Moreover, part of such configurations may be omitted and/or modified without departing from the spirit thereof.

REFERENCE SIGNS LIST

1-1 to 1-4 command device; 2 charging-discharging device; 3 EV; 4, 6 PCS; 5, 51 storage battery; 7 PV; 8, 8a central command device; 9 setting value management device; 10 load; 11 first communication unit; 12 reporting unit; 13 setting unit; 14 second communication unit; 15 low-pass filter; 16 high-pass filter; 17 amount-of-control calculation unit; 20 distribution transformer; 21 power distribution line; 22 switchgear; 23 communication network; 24, 24a power quality management system; 31, 32 charge-discharge control system; 33 power generation control system; 81, 91 communication unit; 82, 82a planning unit; 83 control command generation unit; 84, 84a, 94 storage unit; 92 simulation unit; 93 setting value determination unit; 95 actual result evaluation unit.

The invention claimed is:

1. A command device comprising:

communication circuitry to receive a first command value that is periodically commanded at a control period, the first command value representing an externally-commanded charge-discharge amount with respect to a storage battery connected to a power system;

short-period fluctuation extraction circuitry to extract a short-period fluctuation, which is a fluctuation having a period shorter than the control period, of a measurement value with respect to electrical power at an interconnection point of a power control device that controls charging and discharging of the storage battery; and amount-of-control calculation circuitry to calculate a third command value and to command the power control device to use the third command value, the third command value being a result of addition of the first command value and a second command value, the second command value being generated based on the short-period fluctuation.

2. The command device according to claim 1, wherein the short-period fluctuation extraction circuitry includes a low-pass filter to perform first-order lag filtering on the measurement value to extract a long-period fluctuation, which is a fluctuation having a period longer than the control period, and a high-pass filter to subtract the long-period fluctuation from the measurement value to extract the short-period fluctuation.

3. The command device according to claim 2, wherein the second command value is calculated using a coefficient for determining a ratio of the second command value to the first command value.

4. The command device according to claim 3, wherein the amount-of-control calculation circuitry calculates the third command value by calculating an amount of deviation from a range of a dead zone as a component to be controlled, and subtracting, from the first command value, a result of multiplication of a value generated by inversion of a positive or negative sign of the component to be controlled by the coefficient, when the short-period fluctuation falls outside the range of the dead zone.

5. The command device according to claim 4, wherein the communication circuitry receives a time constant for use in the first-order lag filtering, the range of the dead zone, and the coefficient, from another device.

6. The command device according to claim 1, wherein the power system includes a power distribution line supplied with regenerative power from a train, from a feeder line.

7. The command device according to claim 1, wherein the measurement value is a voltage at the interconnection point.

8. The command device according to claim 1, wherein the storage battery is connected between a rectifier connected to a feeder system and a feeder line, and the measurement value is active power in the rectifier.

9. The command device according to claim 1, wherein the storage battery is connected between a rectifier connected to a feeder system and a transformer, and the measurement value is active power in the rectifier.

10. The command device according to claim 1, wherein the short-period fluctuation is a fluctuation having a period of one minute or less.

11. A charge-discharge control system to control charging and discharging of a storage battery connected to a power system, the charge-discharge control system comprising:

communication circuitry to receive a first command value that is periodically commanded at a control period, the first command value being a command value of an externally-commanded charge-discharge amount of the storage battery;

short-period fluctuation extraction circuitry to extract a short-period fluctuation, which is a fluctuation having a period shorter than the control period, of a measurement value with respect to electrical power at an interconnection point; and power control circuitry to control charging and discharging of the storage battery based on a third command value, the third command value being a result of addition of the first command value and a second command value, the second command value being generated based on the short-period fluctuation.

12. A power control system to control a power system, the power control system comprising:

a charge-discharge control system to control charging and discharging of a storage battery connected to the power system; and a central command device to generate a first command value to ensure quality of the power system, and to command the charge-discharge control system to use the first command value, the first command value being a command value that is periodically commanded at a control period for charging and discharging of the storage battery, wherein the charge-discharge control system includes communication circuitry to receive the first command value, short-period fluctuation extraction circuitry to extract a short-period fluctuation, which is a fluctuation having a period shorter than the control period, of a measurement value with respect to electrical power at an interconnection point, and power control circuitry to control charging and discharging of the storage battery based on a third command value, the third command value being a result of addition of the first command value and a second command value, the second command value being generated based on the short-period fluctuation.

13. The power control system according to claim 12, wherein the short-period fluctuation extraction circuitry includes a low-pass filter to perform first-order lag filtering on the measurement value, and to output a result of the first-order lag filtering, and a high-pass filter to subtract an output from the low-pass filter from the measurement value to extract the short-period fluctuation.

14. The power control system according to claim 13, wherein the charge-discharge control system includes amount-of-control calculation circuitry to calculate the third command value by calculating an amount of deviation from a range of a dead zone as a component to be controlled, and subtracting, from the first command value, a result of multiplication of a value generated by inversion of a positive or negative sign of the component to be controlled by a coefficient, when the short-period fluctuation falls outside the range of the dead zone.

15. The power control system according to claim 14, comprising:

a setting value management device to determine a time constant for use in the first-order lag filtering, the range of the dead zone, and the coefficient, and to transmit the time constant, the range of the dead zone, and the coefficient determined, to the charge-discharge control system.

16. The power control system according to claim 15, wherein the charge-discharge control system transmits, as actual result information, at least one of the measurement value, the short-period fluctuation, or the third command value to the setting value management device, and the setting value management device determines at least one of the time constant, the range of the dead zone, or the coefficient using the actual result information.

17. The power control system according to claim 12, comprising:

a power generation control system to convert direct current power into alternating current power, the direct current power being generated by a sunlight power generation facility connected to the power system, wherein the central command device generates a fourth command value to ensure quality of the power system, and commands the power generation control system to use the fourth command value, the fourth command value being a command value for controlling an output of the power generation control system, and the power generation control system includes communication circuitry to receive the fourth command value, short-period fluctuation extraction circuitry to extract a short-period fluctuation of a measurement value with respect to electrical power at an interconnection point, and power control circuitry to control the output of the power generation control system based on a sixth command value, the sixth command value being a result of addition of the fourth command value and a fifth command value, the fifth command value being generated based on the short-period fluctuation extracted by the short-period fluctuation extraction circuitry in the power generation control system.

18. A central command device wherein the central command device determines a first command value, that is periodically commanded at a control period, using predicted values of an amount of load and of a power generation quantity in a power system under a limiting condition where an absolute value of an amount of control of charging-discharging of a storage battery connected to the power system is less than or equal to a chargeable amount during charging, and is less than or equal to a dischargeable amount of discharge during discharging, and commands a charge-discharge control system to use the first command value, the first command value being the amount of control to reduce an amount of deviation from a proper voltage range of voltage of the power system, the charge-discharge control system controlling charging and discharging of the storage battery, the chargeable amount and the dischargeable amount are determined based on a short-period fluctuation, which is a fluctuation having a period shorter than the control period, of electrical power at an interconnection point of the charge-discharge control system, the charge-discharge control system controls charging and discharging of the storage battery based on a third command value, the third command value being a result of addition of the first command value and a second command value, the second command value being generated based on a short-period fluctuation extracted from a measurement value with respect to electrical power at the interconnection point.

19. A setting value management device, wherein the setting value management device determines a setting value for use in calculation of a third command value, and transmits the setting value to a charge-discharge control system for controlling charging and discharging of a storage battery connected to a power system, wherein the charge-discharge control system receives a first command value that is periodically commanded at a control period, extracts a short-period fluctuation, which is a fluctuation having a period shorter than the control period, of a measurement value with respect to electrical power at an interconnection point, and controls charging and discharging of the storage battery based on the third command value, the third command value being a result of addition of the first command value and a second command value, the first command value being a command value of an externally-commanded charge-discharge amount of the storage battery, the second command value being generated based on the short-period fluctuation, the setting value management device obtains at least one of the measurement value, the short-period fluctuation, or the third command value as actual result information, and determines the setting value using the actual result information.

20. A charge-discharge control method for use in a command device that generates a command for a power control device that controls a storage battery connected to a power system, the charge-discharge control method comprising:

receiving a first command value that is periodically commanded at a control period, the first command value representing an externally-commanded charge-discharge amount with respect to the storage battery;

extracting a short-period fluctuation, which is a fluctuation having a period shorter than the control period, of a measurement value with respect to electrical power at an interconnection point of the power control device that controls charging and discharging of the storage battery; and calculating a third command value and commanding the power control device to use the third command value, the third command value being a result of addition of the first command value and a second command value, the second command value being generated based on the short-period fluctuation.

21. A non-transitory storage medium storing a program for causing a computer system to perform:

receiving a first command value that is periodically commanded at a control period, the first command value representing an externally-commanded charge-discharge amount with respect to a storage battery connected to a power system;

extracting a short-period fluctuation, which is a fluctuation having a period shorter than the control period, of a measurement value with respect to electrical power at an interconnection point of a power control device that controls charging and discharging of the storage battery; and calculating a third command value and commanding the power control device to use the third command value, the third command value being a result of addition of the first command value and a second command value, the second command value being generated based on the short-period fluctuation.

* * * * *